United States Patent
Dmukhin et al.

(10) Patent No.: US 11,847,756 B2
(45) Date of Patent: Dec. 19, 2023

(54) GENERATING GROUND TRUTHS FOR MACHINE LEARNING

(71) Applicant: Snap Inc., Santa Monica, CA (US)

(72) Inventors: Gleb Dmukhin, Kyiv (UA); Egor Nemchinov, London (GB); Yurii Volkov, Kyiv (UA)

(73) Assignee: SNAP INC., Santa Monica, CA (US)

( * ) Notice: Subject to any disclaimer, the term of this patent is extended or adjusted under 35 U.S.C. 154(b) by 64 days.

(21) Appl. No.: 17/506,215

(22) Filed: Oct. 20, 2021

(65) Prior Publication Data

US 2023/0118572 A1    Apr. 20, 2023

(51) Int. Cl.
*G06T 19/20* (2011.01)
*G06N 3/02* (2006.01)
*G06T 17/20* (2006.01)
*H04L 51/10* (2022.01)

(52) U.S. Cl.
CPC .............. *G06T 19/20* (2013.01); *G06N 3/02* (2013.01); *G06T 17/205* (2013.01); *H04L 51/10* (2013.01)

(58) Field of Classification Search
CPC ......... G06T 19/20; G06T 17/205; G06N 3/02; H04L 51/10
See application file for complete search history.

(56) References Cited

U.S. PATENT DOCUMENTS

| 9,036,898 B1 * | 5/2015 | Beeler ................. G06T 19/20 382/154 |
| 11,341,605 B1 * | 5/2022 | Singh ..................... G06T 1/20 |
| 2010/0111370 A1 * | 5/2010 | Black .................. G06F 18/2321 705/26.1 |
| 2019/0266796 A1 * | 8/2019 | Comer .................... G06T 17/20 |
| 2019/0340810 A1 | 11/2019 | Sunkavalli et al. |

(Continued)

OTHER PUBLICATIONS

Alhashim et al., "Topology-Varying 3D Shape Creation via Structural Blending", 201407, ACM (Year: 2014).*

(Continued)

*Primary Examiner* — YuJang Tswei
(74) *Attorney, Agent, or Firm* — SCHWEGMAN LUNDBERG & WOESSNER, P.A.

(57) ABSTRACT

A messaging system processes three-dimensional (3D) models to generate ground truths for training machine learning models for applications of the messaging system. A method of generating ground truths for machine learning includes generating a plurality of first rendered images from a first 3D base model where each first rendered image includes the 3D base model modified by first augmentations of a plurality of augmentations. The method further includes determining for a second 3D base model incompatible augmentations of the first plurality of augmentations, where the incompatible augmentations indicate changes to fixed features of the second 3D base model, and generating a plurality of second rendered images from a second 3D base model, each second rendered image comprising the second 3D base model modified by second augmentations, the second augmentations corresponding to the first augmentations of a corresponding first rendered image, where the second augmentations comprises augmentations of the first augmentations that are not incompatible augmentations.

18 Claims, 29 Drawing Sheets

(56) References Cited

U.S. PATENT DOCUMENTS

| | | |
|---|---|---|
| 2019/0371080 A1* | 12/2019 | Sminchisescu ......... G06T 17/20 |
| 2020/0284883 A1* | 9/2020 | Ferreira .................. G01S 17/10 |
| 2020/0320777 A1 | 10/2020 | Meshry et al. |
| 2021/0034921 A1 | 2/2021 | Pinkovich et al. |
| 2021/0065440 A1 | 3/2021 | Sunkavalli et al. |
| 2022/0101596 A1 | 3/2022 | Volkov et al. |
| 2022/0237838 A1* | 7/2022 | Liu ........................ G06N 3/063 |

OTHER PUBLICATIONS

Geng et al., "Warp-guided GANs for single-photo facial animation", 2018,ACM (Year: 2018).*
"International Application Serial No. PCT US2022 078410, International Search Report dated Feb. 17, 2023", 5 pgs.
"International Application Serial No. PCT US2022 078410, Written Opinion dated Feb. 17, 2023", 8 pgs.

* cited by examiner

GENERATING GROUND TRUTHS FOR MACHINE LEARNING

TECHNICAL FIELD

Examples of the present disclosure relate generally to generating ground truths for training machine learning (ML) models. More particularly, but not by way of limitation, examples of the present disclosure relate to generating ground truths of images where the images are based on a three-dimensional (3D) base model for the ground truth input and a modified 3D base model for the ground truth output, and where augmentations are applied to the 3D base models to ensure the ground truths are diverse and inclusive.

BACKGROUND

Generating ground truths to train machine learning models such as convolutional neural networks (CNNs) is time consuming and, often, the ground truth inadequately trains the CNN to process the inputs so that poor quality outputs are obtained.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
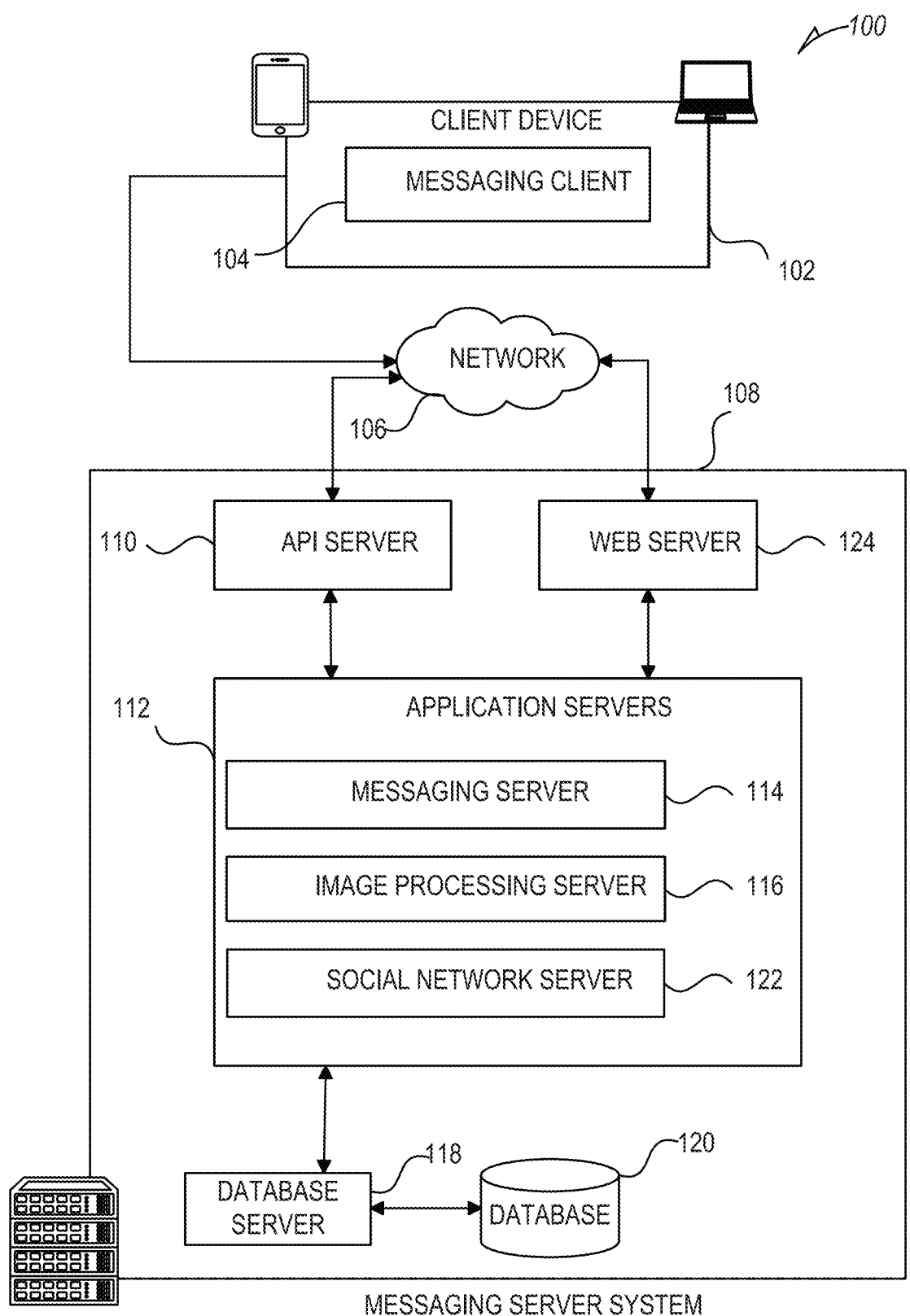
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

In some examples, a ground truth includes ground truth inputs and ground truth output where the ground truth inputs are matched one-to-one with the ground truth outputs. The training module for an ML model such as CNN uses as input a ground truth input and then compares the output of the CNN with the corresponding ground truth output. In this way, the CNN training module can compare the actual output of the CNN with the ground truth output, which the CNN should have output. The CNN training module can then adjust the weights of the CNN so the CNN's output for the ground truth input will more closely match the corresponding ground truth output.

Training ML models such as CNNs is difficult because of the challenges in generating ground truths to use to train the ML models. For example, when the ground truths are composed of images, the problems are compounded because modifying and rendering images is time consuming and often beyond the ability of application developers. Additionally, it is difficult to create ground truths that are both inclusive and diverse. In the following images depicting heads of people or cartoons are described but other images may be used. Inclusive indicates the property that different groups of people that may use the trained ML model are included in the ground truth. For example, the ground truth should include people with different color skin, different ages, different face shapes, different genders, and so forth. Diverse indicates the property that the ground truth should have a variability within the inclusive properties. For example, the ground truth should include many different shades of skin color, many different ages, many different expressions on the faces, many different expressions for the eyes, and so forth.

One example technical problem is how to generate a large enough ground truth for training the ML model where the ground truth is both diverse and inclusive. The number of pairs of input and output images that are required for a ground truth is prohibitively expensive to generate by capturing actual images or by hand creating each image. In some examples, the technical problem is addressed by generating a 3D model for the ground truth input and a 3D model for the ground truth output where proxy objects are associated with the 3D models. The proxy objects indicate how to apply a category of augmentations to the 3D models where a category of augmentations is hair, facial expressions, facial structure, and so forth. Additionally, the technical problem is addressed by using fixed augmentations that indicate that augmentations should not be applied for a category of the fixed augmentations. For example, the ears or skin color may be a property of the 3D model for the ground truth output so the ears and skin color are indicated as fixed augmentations and not varied for the ground truth output but are varied for the ground truth input.

Moreover, the example technical problem is addressed by using blend shape augmentations that indicate how to change or modify a 3D model to have a new characteristic. For example, the 3D models are composed of a mess of polygons and a blend shape for smiling indicates how to change the vertices of the polygons of the 3D model to make a face of the 3D model smile. The blend shapes enable an automating a wide variety of modifications to the 3D models.

Additionally, the example technical problem is addressed with mattes where segments of the 3D models are generated. The segments are used to quickly select portions of the 3D models to modify or apply augmentations to such as the eyes. In some examples a ML model such as a CNN is trained to process images using the generated ground truth input and ground truth output. The CNN is then integrated with an application. The ability to generate a ground truth enables application developers to develop robust image processing applications without spending a prohibitive amount of time developing the ground truth.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112 and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
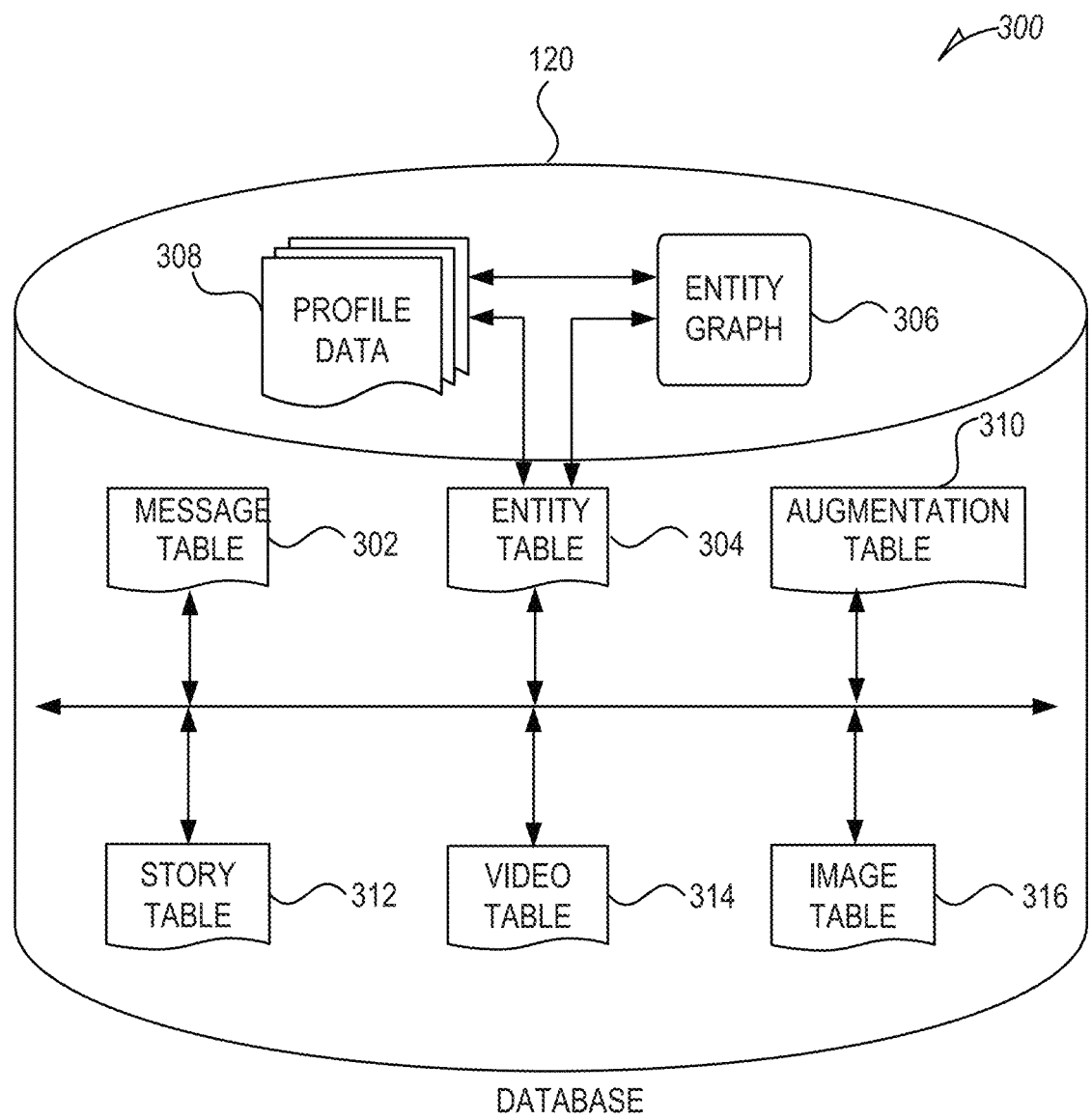
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

System Architecture

Figure 2:
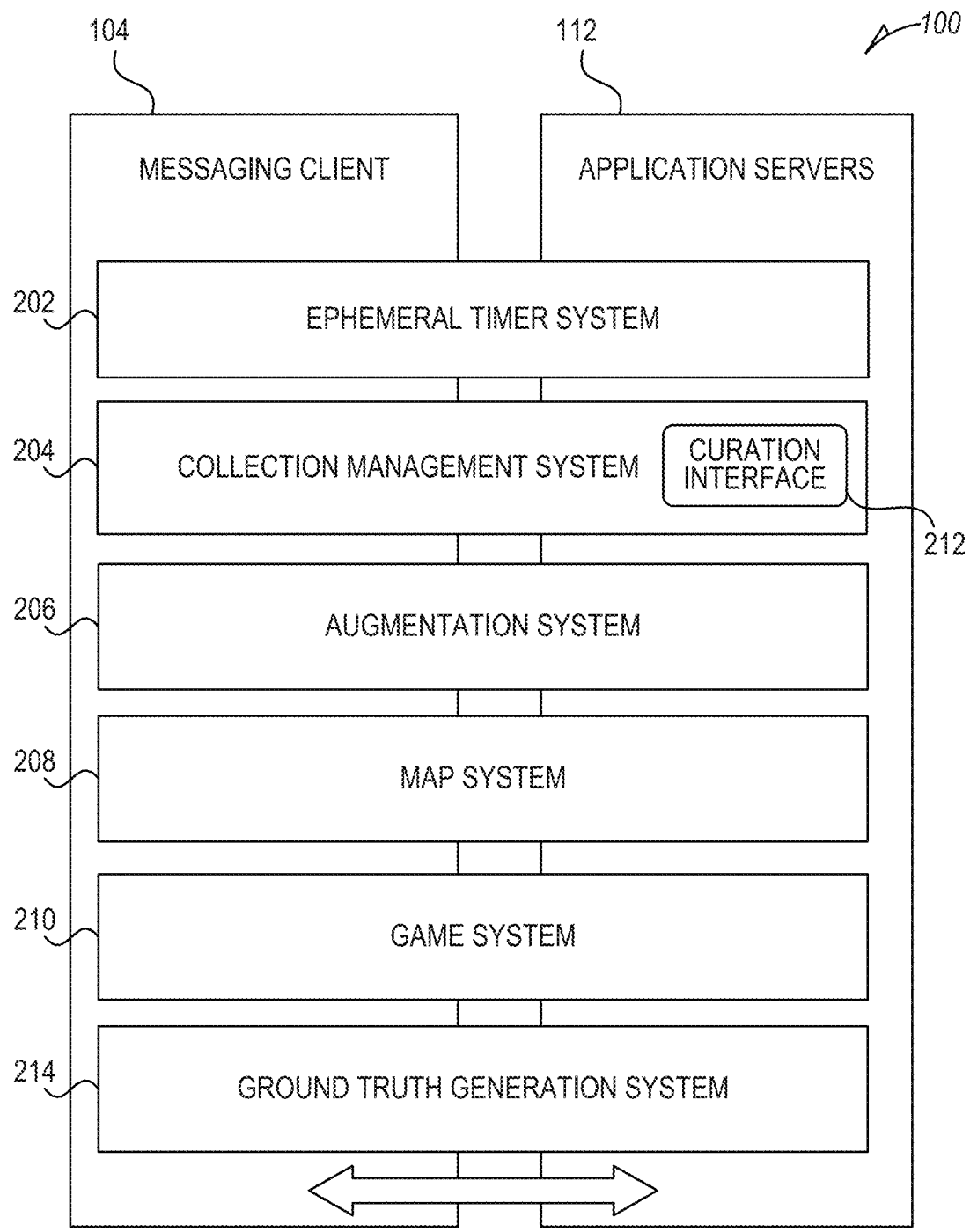
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, a modification system 206, a map system 208, a game system 210, and a ground truth generation system 214.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The ground truth generation system 214 provides various functions related to generating ground truths for training machine learning models. The ground truth generation system 214 enables a user to generate a ground truth input 626 and ground truth output 662 for training a machine learning model. The ground truth generation system 214 provides access to an augmentation database 612 to enable ground truths to be generated that are diverse and inclusive.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some examples, features are located using a landmark, which represents a distinguishable point present in a number of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314. The database 120 can also store the augmentation database 612 and models 602 of FIG. 6.

Data Communications Architecture

Figure 4:
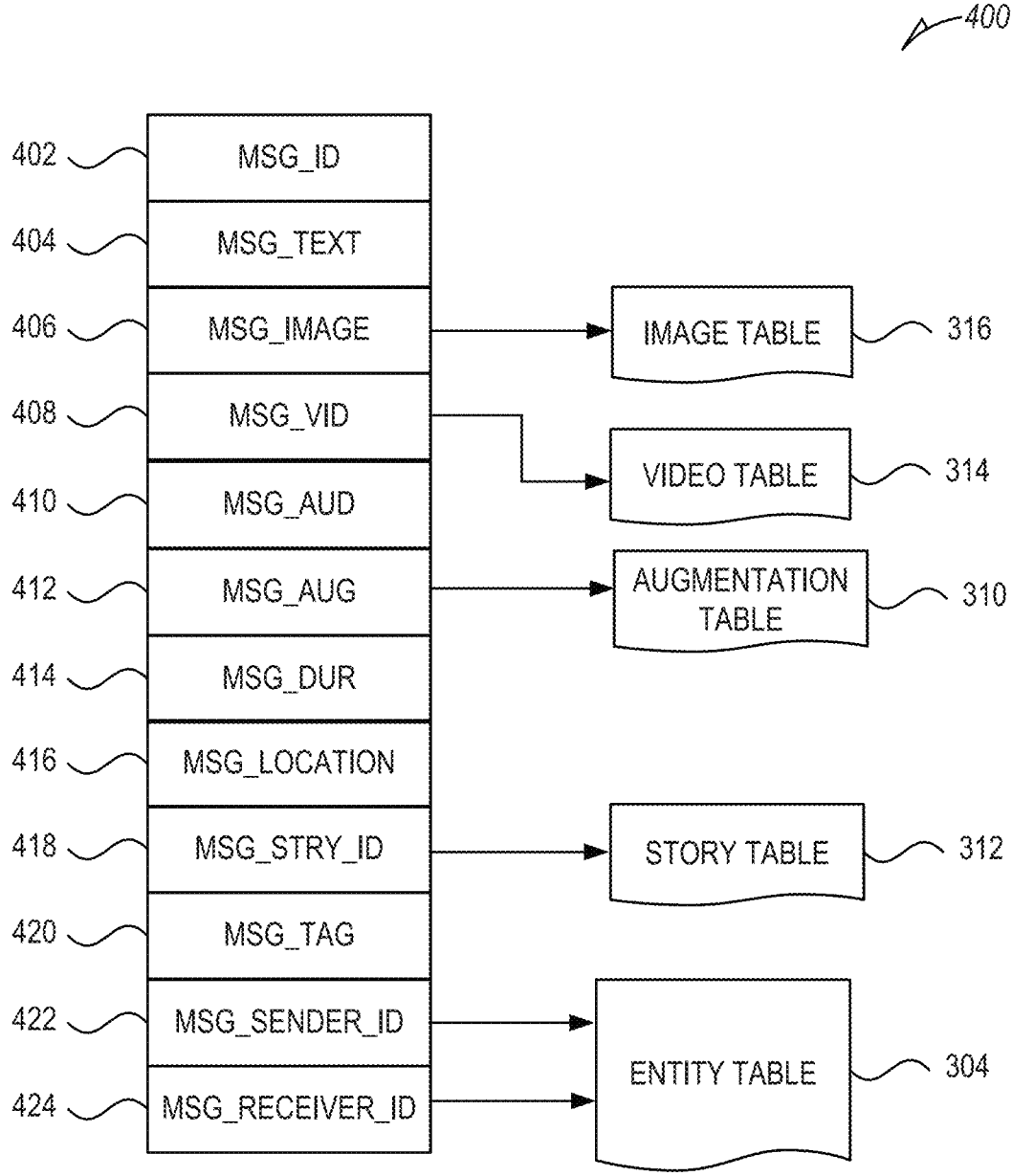
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:

Message identifier 402 (MSG_ID 402): a unique identifier that identifies the message 400. Message text payload 404 (MSG_TEXT 404): text, to be generated by a user via a user interface of the client device 102, and that is included in the message 400.

Message image payload 406 (MSG_IMAGE 406): image data, captured by a camera component of a client device 102 or retrieved from a memory component of a client device 102, and that is included in the message 400. Image data for a sent or received message 400 may be stored in the image table 316.

Message video payload 408: video data, captured by a camera component or retrieved from a memory component of the client device 102, and that is included in the message 400. Video data for a sent or received message 400 may be stored in the video table 314.

Message audio payload 410: audio data, captured by a microphone or retrieved from a memory component of the client device 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

Message duration parameter 414 (MSG_DUR 414): parameter value indicating, in seconds, the amount of time for which content of the message (e.g., the message image payload 406, message video payload 408, message audio payload 410) is to be presented or made accessible to a user via the messaging client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

Message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the Client device 102 on which the message 400 was generated and from which the message 400 was sent.

Message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Time-Based Access Limitation Architecture

Figure 5:
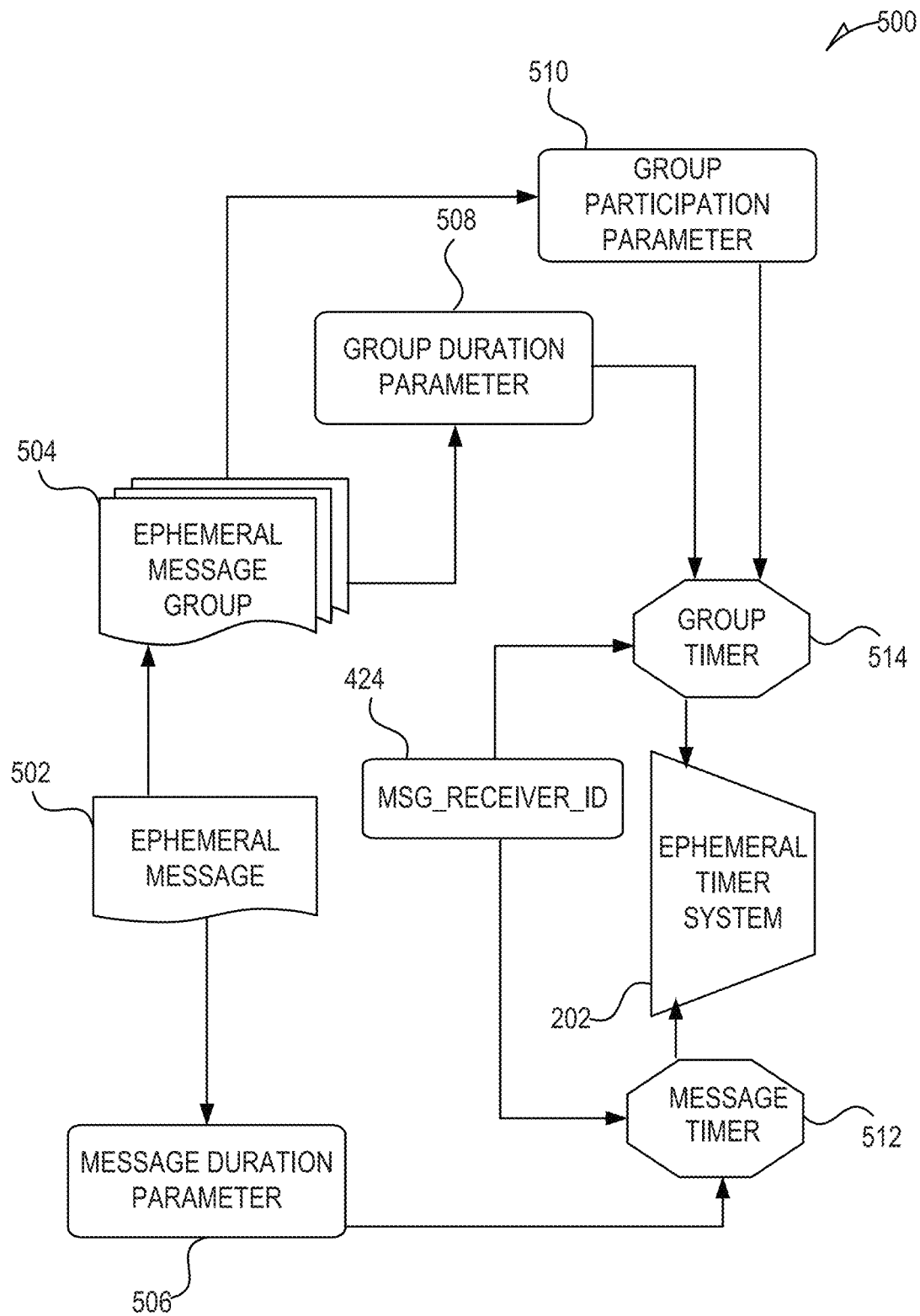
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified twenty-four hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Generating Ground Truths for Machine Learning

Figure 6:
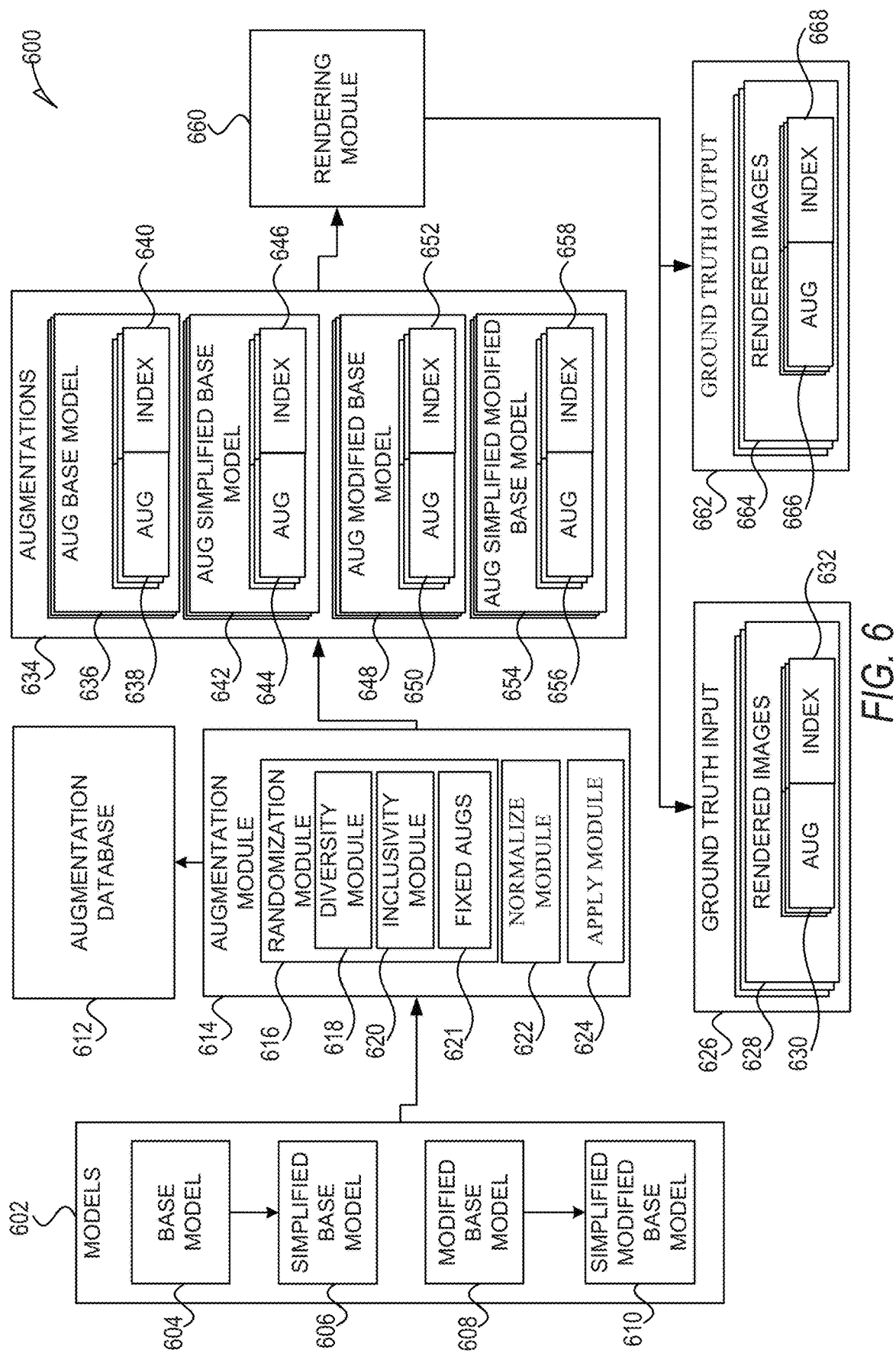
FIG. 6 illustrates generating ground truths for machine learning, in accordance with some examples.

FIG. 6 illustrates generating ground truths for machine learning 600, in accordance with some examples. The augmentation module 614 processes the models 602 using the augmentation database 612 to generate augmentations 634. The rendering module 660 processes the augmentations 634 to generate the ground truth input 626 and ground truth output 662. The ground truth input 626 includes augmentations 630 and indexes 632, which provides an index 632 to each of the augmentations 630 that have been applied to each of the rendered images 628. Similarly, the ground truth output 662 includes augmentations 666 and indexes 668, which provides an index 668 to each of the augmentations 666 that have been applied to each of the rendered images 664.

Figure 8:
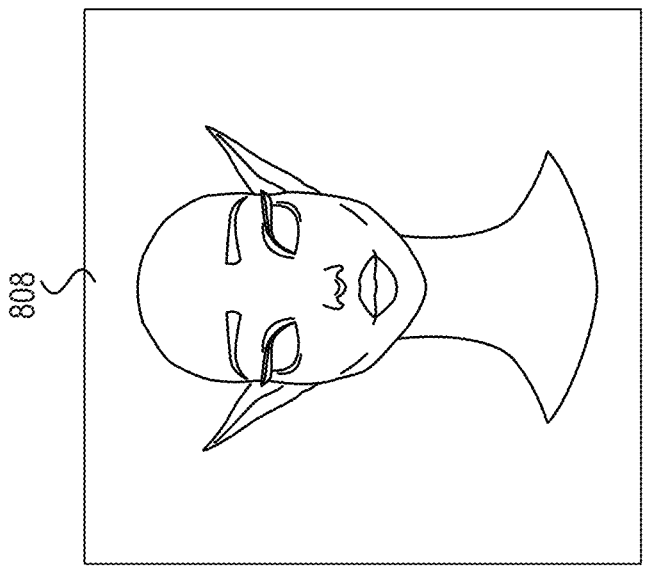
FIG. 8 illustrates a base model and a modified base model, in accordance with some examples.
Figure 8:
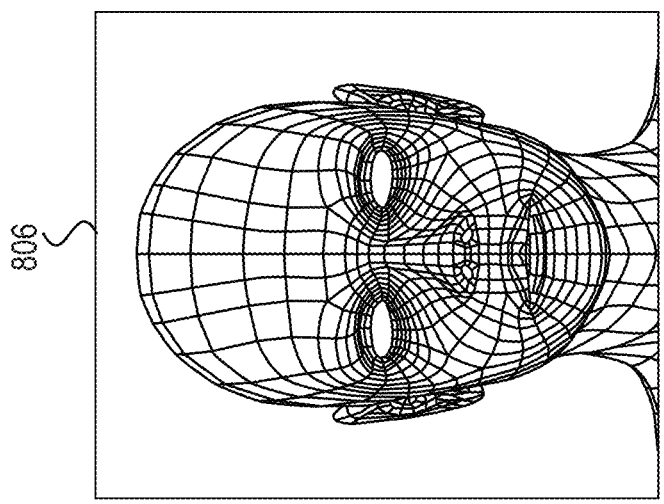

The ground truth input 626 and ground truth output 662 are used for machine learning such as training the convolutional neural network (CNN) 2206. The models 602 include a base model 604, a simplified base model 606, a modified base model 608, and a simplified modified base model 610. The models 602 are three-dimensional (3D) meshes of polygons, in accordance with some examples. The base model 604 and simplified base model 606 are used to generate the ground truth input 626. The modified base model 608 and simplified modified base model 610 are used to generate the ground truth output 662. FIG. 8 is disclosed in conjunction with FIG. 6. FIG. 8 illustrates a base model 806 and a modified base model 808, in accordance with some examples. Referring to FIG. 8, base model 806 is the base model 604 and modified base model 808 is the modified base model 608. In some examples, the modified base model 608 is derived from the base model 604. For example, the modified base model 608 includes turning the base model 604 into a cartoon character by exaggerating the features of the base model 604 to make the modified base model 608 appear like an elfin creature. In other examples, the modified base model 608 is separate from the base model 608. When the base model 604 or modified base model 608 are discussed, it is understood that the discussion applies to several of the models 602. The base model 806 and modified base model 808 are composed of a mess of polygons with vertices.

The base model 604 and modified base model 608 are sculptured in a graphics application, in some examples. In other examples the base model 604 or modified base model 608 are generated from an image or a 3D scan of a head where the image or 3D scan is converted into a 3D model represented by polygons. Faces are the primary focus of the models 602 and the augmentation database 612 but other images may be used such as full human bodies, animals such as horses, objects such as houses, animations such as cartoons, videos, and so forth.

The base model 604 and modified base model 608 have a greater number of polygons than the simplified base model 606 and simplified modified base model 610, respectively. The reduced number of polygons enables more augmentations 634 to be generated and more rendered images 628, 664 to be generated. Additionally, the fewer polygons simplify the process of adding some of the augmentations 634. The augmentation module 614 is configured to process the base model 604 and modified base model 608 to generate the simplified base model 606 and simplified modified base model 610 using a retopology process.

The augmentation module 614 first processes the base model 604 and simplified base model 606 to generate augmented base model 636 with augmentations 638 and indexes 640 and augmented simplified base models 642 with augmentations 644 and indexes 646. The augmentation module 614 then processes the modified base model 608 and simplified modified base model 610 to generate augmented modified base model 648 with augmentations 650 and indexes 652 and augmented simplified modified base model 654 with augmentations 656 with indexes 658. The augmentation module 614 uses the same augmentations 638 and augmentations 644 used to process the base model 604 and simplified base model 606 to process the modified base model 608 and the simplified based model 610 to generate the augmentations 650 and augmentations 656. In this way there is a one-to-one correspondence between augmented base models 636 and augmented modified base models 648 so that they can be used for training a CNN. Similarly, there is a one-to-one correspondence between the augmented simplified base models 642 and the augmented simplified modified base models 654.

The normalize module 622 processes the models 602 and the augmentations from the augmentation database 612 so that the augmentations can be applied to the models 602. The apply module 624 applies the augmentations to the models 602 to generate the augmentations 634. The normalize module 622 and apply module 624 are described in conjunction with FIGS. 10-23.

Figure 7:
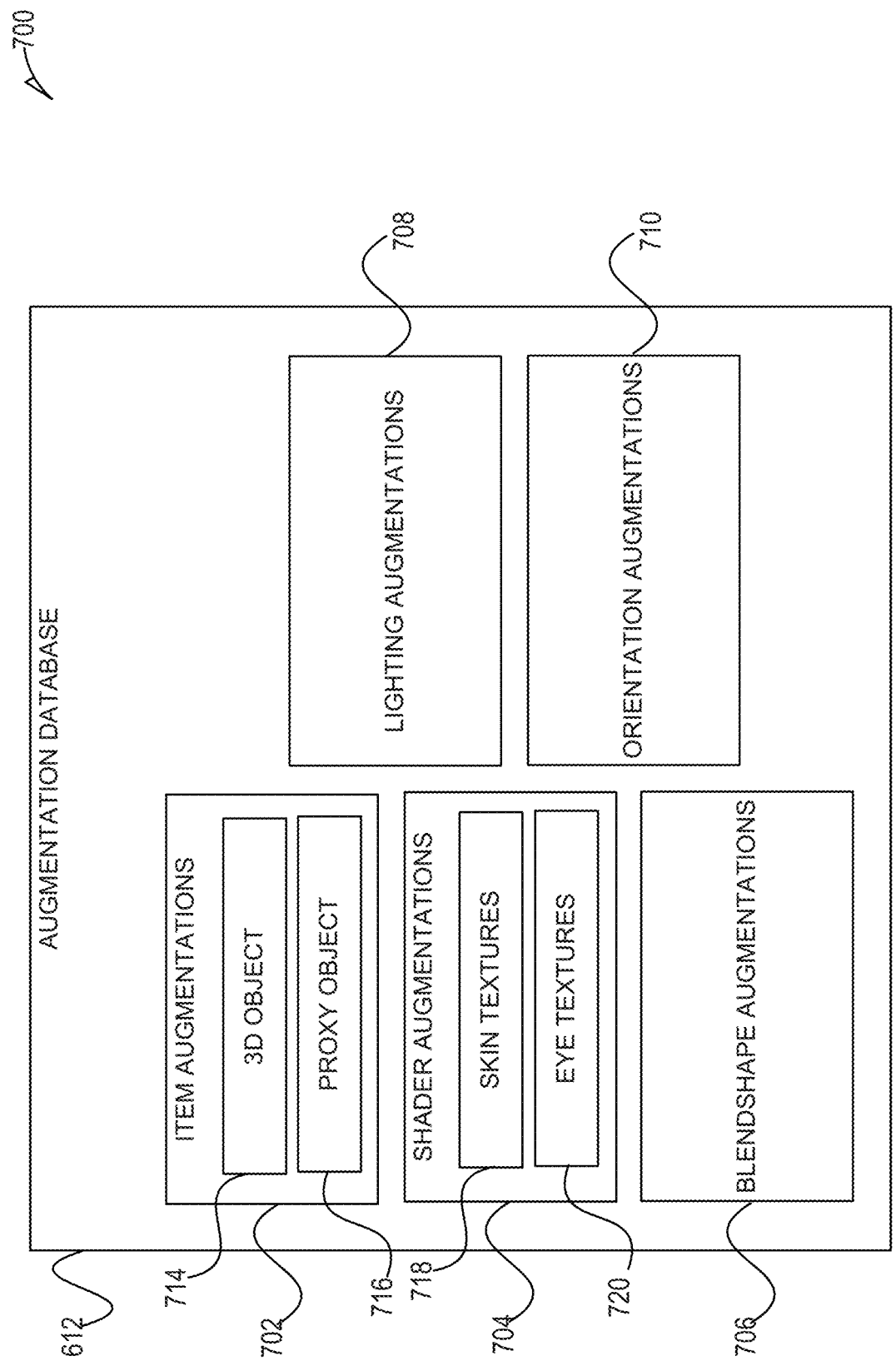
FIG. 7 illustrates augmentation database, in accordance with some examples.

The augmentation module 614 includes randomization module 616 and normalize module 622. The randomization module 616 selects the augmentations 638 and 644 from the augmentation database 612 to apply to the base model 604. FIG. 7 is disclosed in conjunction with FIG. 6. FIG. 7 illustrates augmentation database 612, in accordance with some examples. Augmentation database 612 include item augmentations 702, shader augmentations 704, blendshape augmentations 706 (or blend shape augmentations), lighting augmentations 708, and orientation augmentations 710. When applied by apply module 624, augmentations of the augmentation database 612 cause a change to a model of the models 602. The augmentations of the augmentation database 612 are further described in conjunction with FIGS. 10-23.

The diversity module 618 ensures that the augmentations 638 and 644 selected by the randomization module 616 are diverse for properly training the ML models. For example, the diversity module 618 ensures that lighting augmentations 708, item augmentations 702, which includes clothing augmentations, and blendshape augmentations 706, which include facial emotion augmentations, are selected so that the augmentations 638 and 644 include a diverse selection of human clothes and facial emotions. The diversity module 618 scans and categorizes the augmentation database 612 to ensure the diversity. For example, the diversity module 618 determines categories for facial emotions and ensures that the selection of augmentations 638 and 644 includes a diverse selection of facial emotions. In some examples, the diversity module 618 maintains percentages and then selects the facial emotions if the percentage falls below a predetermined threshold. For example, if the augmentations 638 and 644 include only 10 percentage of facial augmentations that transform the base model 604 into a smile, and a predetermined percentage is to have 15 percentage of augmentations 638 and 644 that transform the base model 604 into a smile, then the diversity module 618 ensures that more augmentations 638 and 644 are selected that transform the base model 604 into a smile. The diversity percentage for smile can be determined based on counting all the augmentations that transform the base model 604 into a smile divided by the total number of augmentations that transform the base model 604 into a facial expression.

The inclusivity module 620 ensures that the augmentations 638 and 644 include augmentations from the augmentation database 612 to avoid implicit biases. For example, the inclusivity module 620 ensures that augmentations 638 and 644 include different skin colors, different facial structures, different genders, and so forth. The inclusivity module 620 maintains an inclusivity percentage for each of the skin colors, the facial structures, and the genders selected for the augmentations 638 and 644. If a percentage falls below a predetermined threshold, then the inclusivity module 620 selects the augmentations 638 and 644 to ensure that the inclusivity percentage is raised above the predetermined threshold. The predetermined thresholds for the inclusivity module 620 are predetermined values.

Fixed augmentations 621 indicates augmentations 638 and 644 that are to be excluded from augmentations 650, 656. For example, referring to FIG. 8, the ears of modified base model 808 are fixed and are part of the transformation that the ML model will perform. Augmentations that modify the ears of the base model 604 and simplified base model 606 are not included for augmented modified base model 648 and augmented simplified modified base model 654. Other augmentation may be included in fixed augmentations 621. For example, if the modified base model 608 has a fixed skin color like blue, then augmentations 638 and 644 that modify the skin color are excluded from augmentations 650, 656. In other examples, fixed augmentations 621 includes lighting, shading, facial expressions, an ear shape, a clothing item, and so forth. In some example, a user that is generating the ground truth input 626 and the ground truth output 662 indicates the fixed augmentations 621 using a user interface.

The rendering module 660 processes the augmentations 634 and generates the rendered images 628 and 664. Rendering high-quality images is computationally intensive. Depending on the complexity of the models 602 and the augmentations 638, 644, 650, and 656 applied to the models 602, rendering a 1024×1024 image on a machine with a modern graphics processing unit (GPU) takes between two and ten minutes. To speed up the rendering, the rendering module 660 is configured to render the images on cloud machines such as web server 124 or application servers 112. Each cloud machine runs an independent rendering process. Each rendering process takes one of the augmentations 634 with all required resources, such as models 602 and augmentations from the augmentation database 612 and compiles a set of rendered images 628, 664. Each rendered image 628, 664 represents a unique combination of an augmented model, such as augmented base model 636, together with lighting augmentations 708 and orientation augmentations 710. In some examples, the rendering module 660 generates files for another applications such as Blender® running on the web servers.

Figure 9:
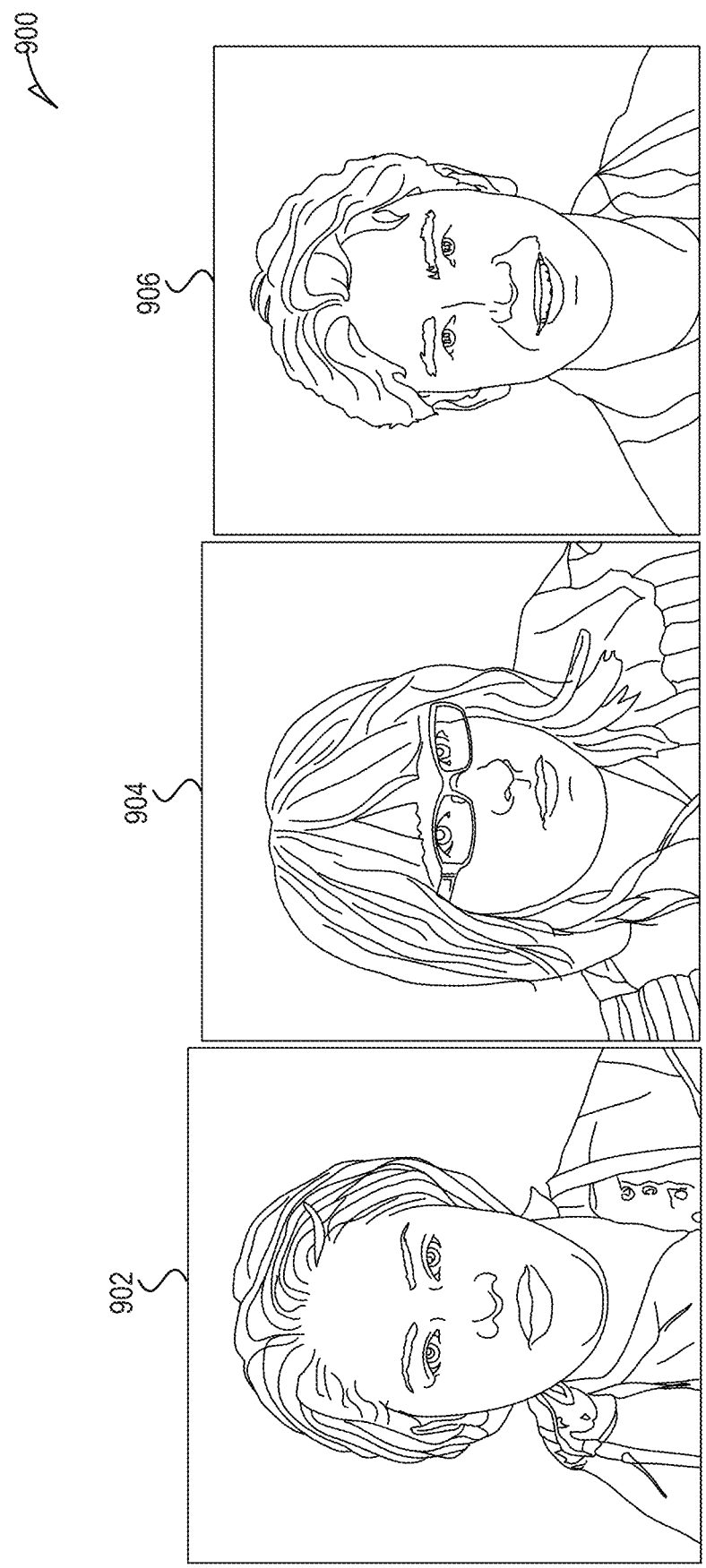
FIG. 9 illustrates different faces, in accordance with some examples.

FIG. 9 is disclosed in conjunction with FIG. 6. FIG. 9 illustrates different faces 900 in accordance with some examples. The faces 902, 904, 906 illustrate the diversity in faces in terms of structure, skin color, hair, clothing, backgrounds, facial expressions, head tilt, lighting, and so forth. The augmentation database 612 includes augmentations so that the ground truth input 626 includes a diverse and inclusive set of rendered images 628. There are many different degrees of freedom that need to be varied to have a diverse and inclusive group of augmentations 634 to train a ML model. For heads of people or cartoons the augmentation database 612 includes augmentations for varying skin color, skin texture, face geometry, gender, accessories such as glasses, clothes, eye expressions, eye color, gaze direction, mouth expressions, brow expressions, and object orientation.

Figure 10:
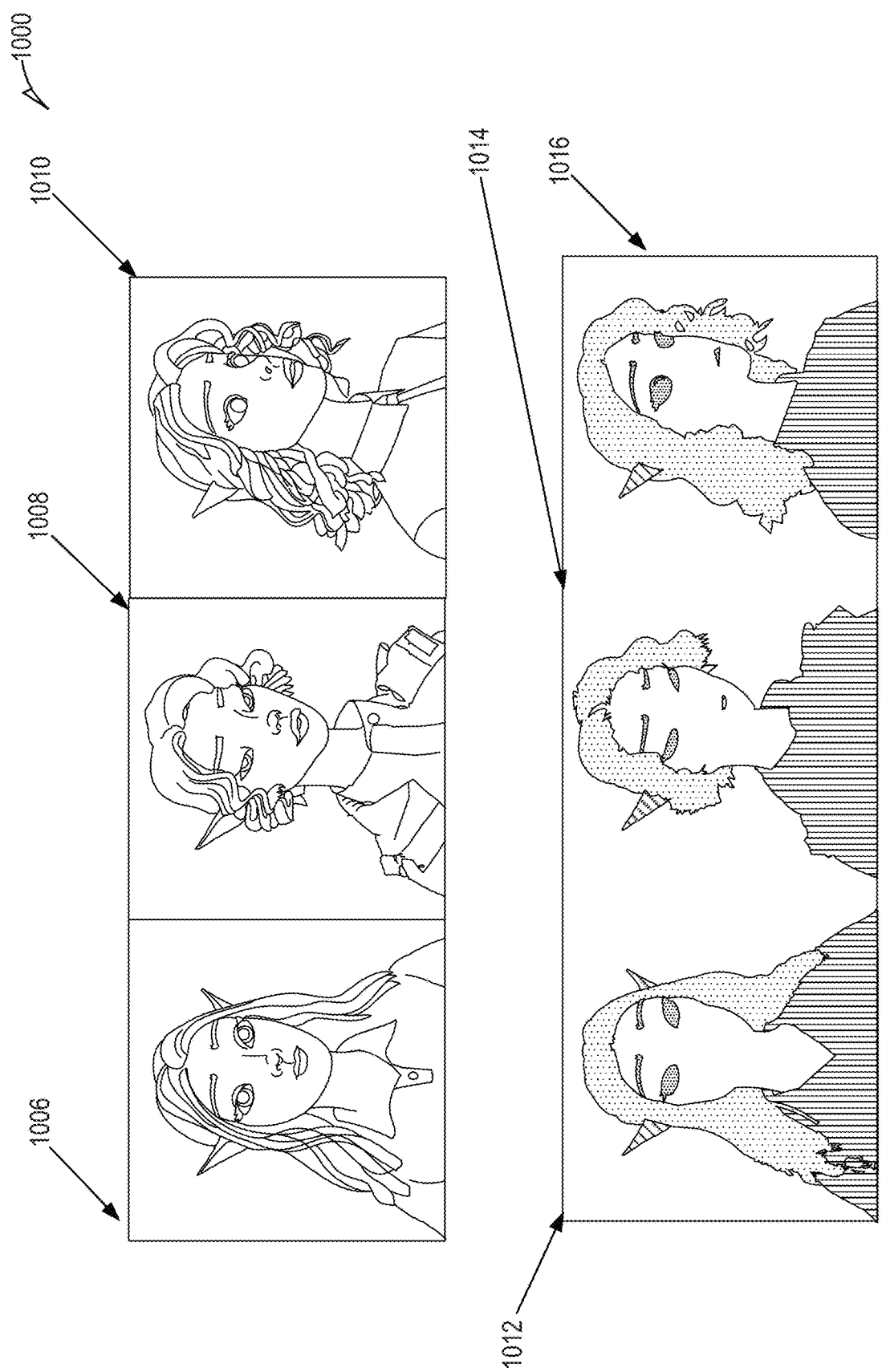
FIG. 10 illustrates an example of rendered images and segmentation maps 1000, in accordance with some examples.

FIG. 10 illustrates an example of rendered images and segmentation maps 1000, in accordance with some examples. The rendered images 1006, 1008, and 1010 are based on the base model 806 or modified base model 808 of FIG. 8. The rendered images 1006, 1008, and 1010 include different augmentations for the hair, head tilt, clothes, skin color, eyes expression, and backgrounds. The segmentation maps 1012, 1014, and 1016 correspond to the rendered images 1006, 1008, and 1010 and are used to facilitate applying augmentations to the base model 808 by the apply module 624. Additionally, the segmentation maps 1012, 1014, and 1016 illustrate that different hair augmentations are applied, different head tilts are applied, different eyes expressions are applied, different clothes augmentations are applied, and that different mouth expressions are applied. Although not illustrated, the same augmentations that are applied to rendered images 1006, 1008, and 1010 are applied to both the base model 806 and the modified base model 608 so that for each of the rendered images 1006, 1008, 1010 there is a corresponding rendered image with the same augmentations derived from the base model 604 or modified base model 608. But the base model 806 or modified base model 608 may have an additional augmentation that modifies the ears that is a fixed augmentation 621 and, thus, not applied to the modified base model 608 or base model 806 by the apply module 624.

Figure 11:
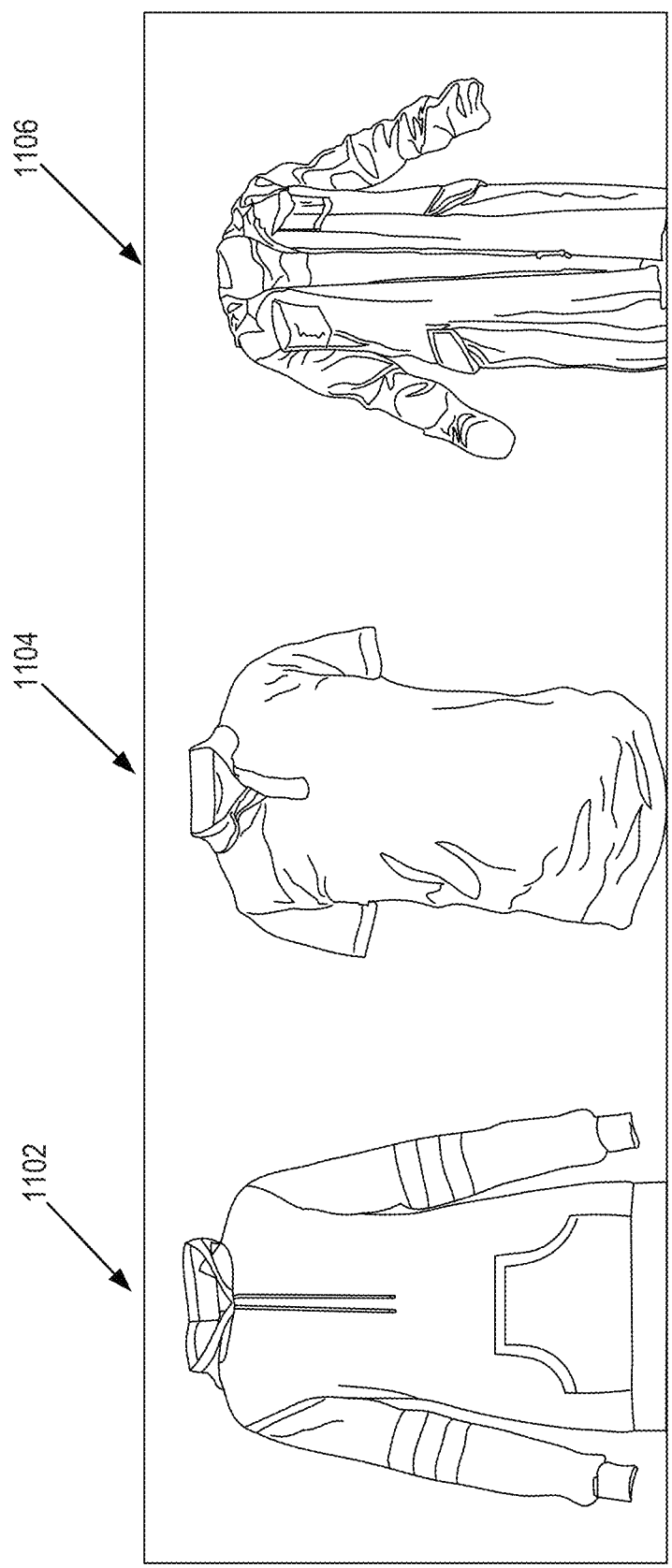
FIG. 11 illustrates clothing augmentations, in accordance with some examples.
Figure 12:
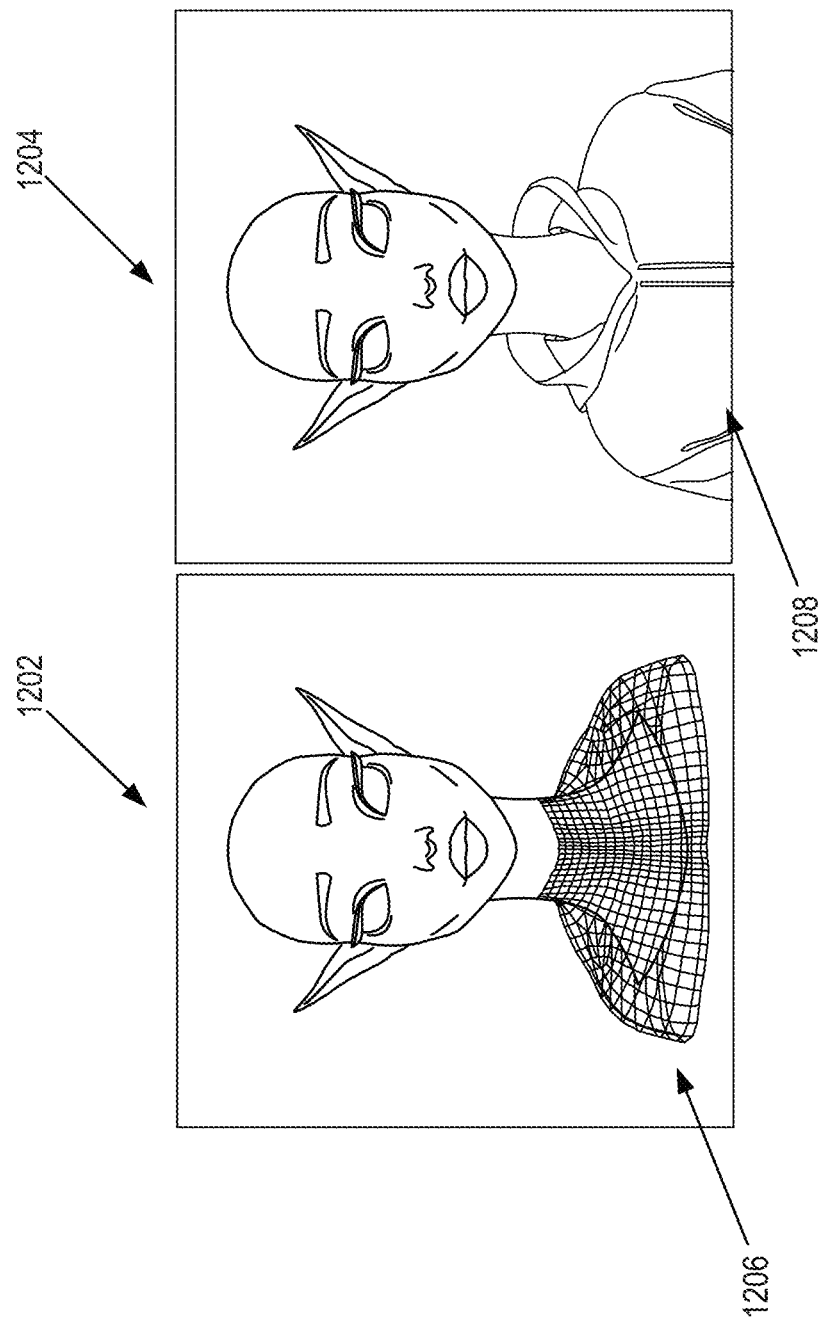
FIG. 12 illustrates a proxy object, in accordance with some examples.
Figure 13:
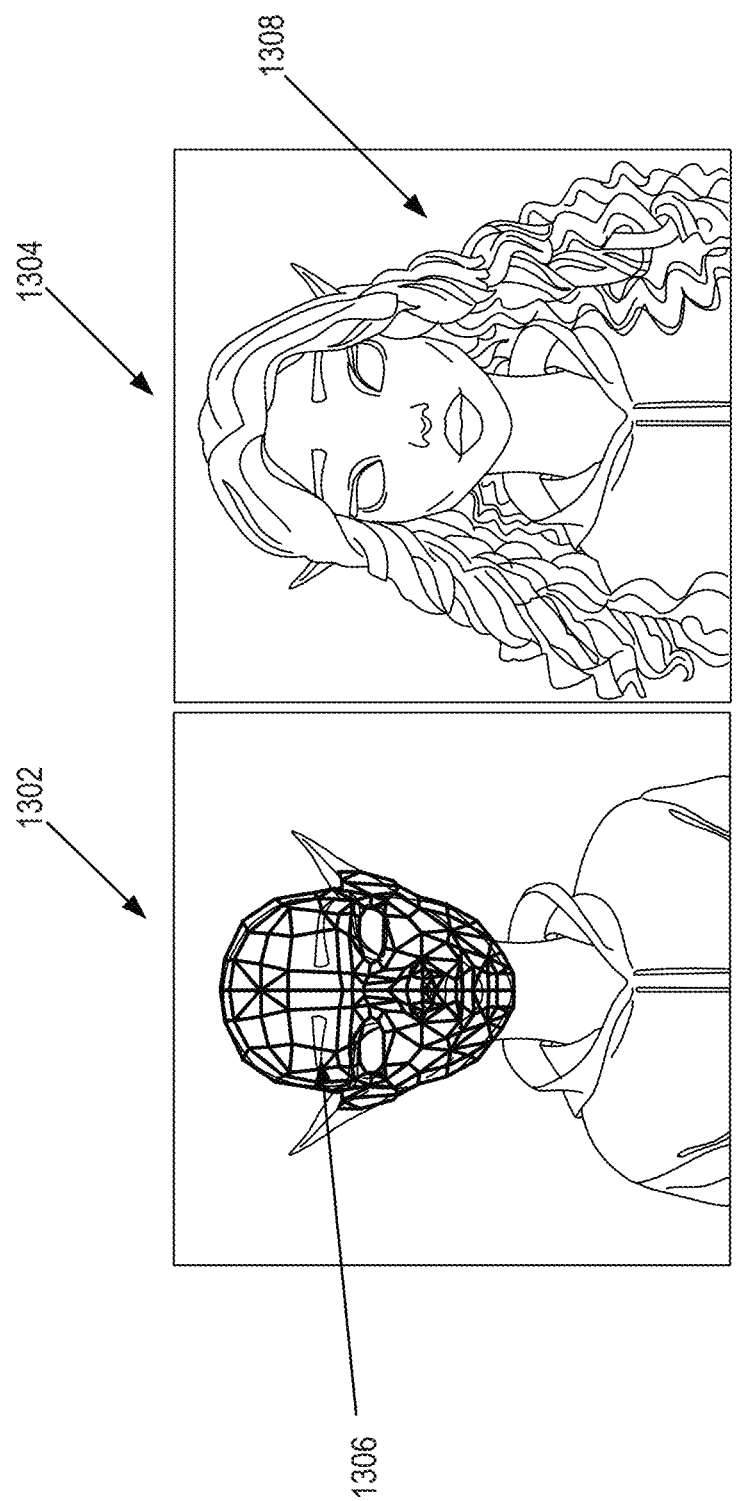
FIG. 13 illustrates a proxy object, in accordance with some examples.

FIG. 11-13 are described in conjunction with one another. FIG. 11 illustrates clothing augmentations. Illustrated in FIG. 11 is three clothing augmentations 1102, 1104, and 1106. The clothing augmentations 1102, 1104, and 1106 are item augmentations 702 from the augmentation database 612. The clothing augmentations 1102, 1104, 1106 are 3D objects 714 with their own texture, shape, and colors. Item augmentations 702 are augmentations that are separate objects that are added to the base model 604 or modified base model 608. The item augmentations 702 include hair, clothing, accessories, glasses, and so forth.

The base model 604 and modified base model 608 have proxy objects 716 for each type of 3D object 714. FIG. 12 illustrates a proxy object 1206, in accordance with some examples. 3D model 1202 is a modified base model 608 such as base model 808 with a proxy object 1206. 3D model 1204 is the modified base model 608 with the clothing augmentation 1102 applied to the 3D model 1202 in accordance with the proxy object 1206 to generate clothing augmentation 1208. The proxy object 1206 is a mess of polygons that indicates how to apply the clothing augmentation The normalize module 622 resizes the clothing augmentation 1102 to fit to the proxy object 1206 and the apply module 624 merges the resized clothing augmentation 1102 with the proxy object 1206 to generate the 3D model 1204 with the clothing augmentation 1102. The color of the clothing augmentation 1102 may be varied. Referring to FIG. 6, the 3D model 1204 is an augmented modified base model 648 such as base model 808 with an augmentation 650 having an index 652 where the augmentation 650 is the clothing augmentation 1102. The augmentation module 614 generates a corresponding augmented base model 636 such as base model 806 with augmentation 638 having an index 640 where augmentation 638 is the same clothing augmentation 1102 applied to the base model 806.

FIG. 13 illustrates a proxy object 1306, in accordance with some examples. 3D model 1302 is a modified base model 608 such as base model 808 with a proxy object 1306. 3D model 1304 is the modified base model 608 with a hair augmentation (not illustrated) applied to the 3D model 1302 in accordance with the proxy object 1306 to generate hair augmentation 1308. The proxy object 1306 is a mess of polygons that indicates how to apply the hair augmentation The normalize module 622 resizes the hair augmentation to fit to the proxy object 1306 and the apply module 624 merges the resized hair augmentation with the proxy object 1306 to generate the 3D model 1304 with the hair augmentation 1308. The color of the hair augmentation may be varied. Referring to FIG. 6, the 3D model 1304 is an augmented modified base model 648 such as base model 808 with an augmentation 650 having an index 652 where the augmentation 650 is a hair augmentation. The augmentation module 614 generates a corresponding augmented base model 636 such as base model 806 with augmentation 638 having an index 640 where augmentation 638 is the same hair augmentation applied to the base model 806.

Figure 14:
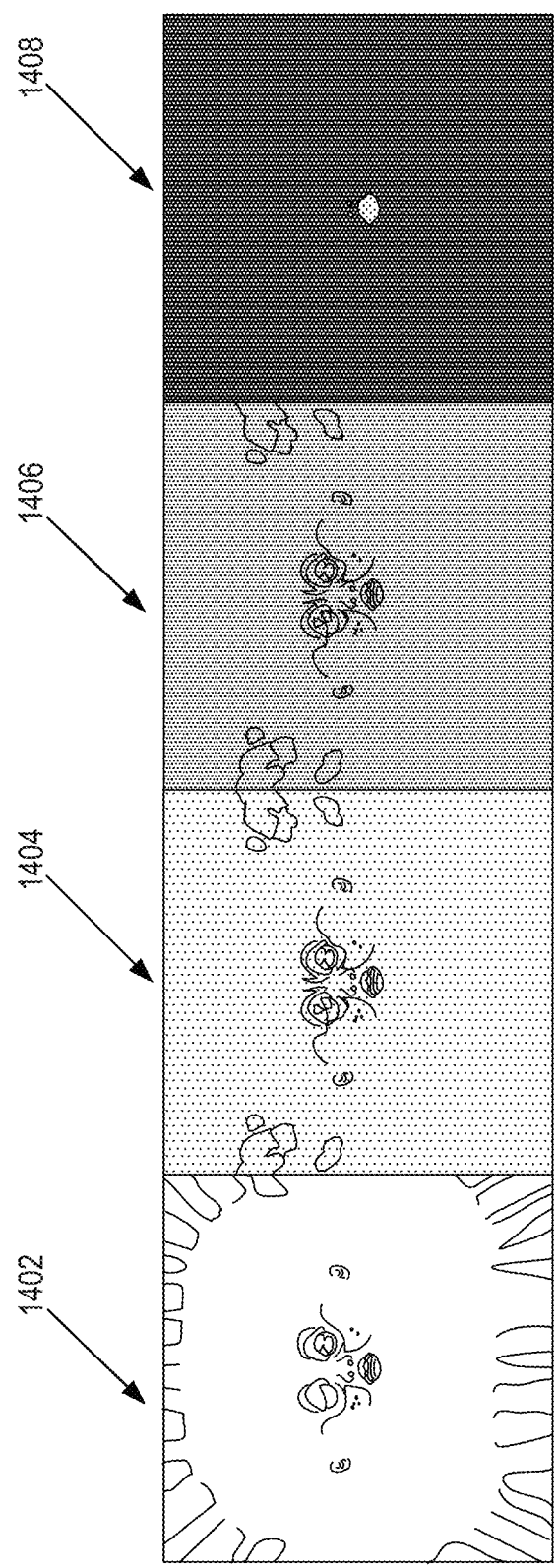
FIG. 14 illustrates skin textures, in accordance with some examples.

FIG. 14 illustrates skin textures 1402, 1404, 1406, and 1406, in accordance with some examples. The skin textures 1402, 1404, 1406, and 1408 are stored in the augmentation database 612 as shader augmentations 704 that are skin textures 718. The skin textures 1402, 1404, 1406, and 1406 are applied to the base model 604 and modified base model 608. Referring to FIG. 10, rendered image 1006 is augmented with skin texture 1404, rendered image 1008 is augmented with skin texture 1408, and rendered image 1010 is augmented with skin texture 1402. The skin textures 1402, 1404, 1406, and 1406 cover different textures used on the base model 604 and modified base model 608 and may be used to cover other augmentations from augmentation database 612 such as item augmentations 702. The skin textures 1402, 1404, 1406, and 1408 are objects represented with polygons and colors. The normalize module 622 resizes the skin textures 1402, 1404, 1406, and 1408 in accordance with the base model 604 or modified base model 608. For example, normalize module 622 resized skin texture 1408 to fit on the base model 808. The apply module 624 then applies the resized skin texture 1408 to the base model 808. Other augmentations are then added and then rendered to generate rendered image 1008.

Figure 15:
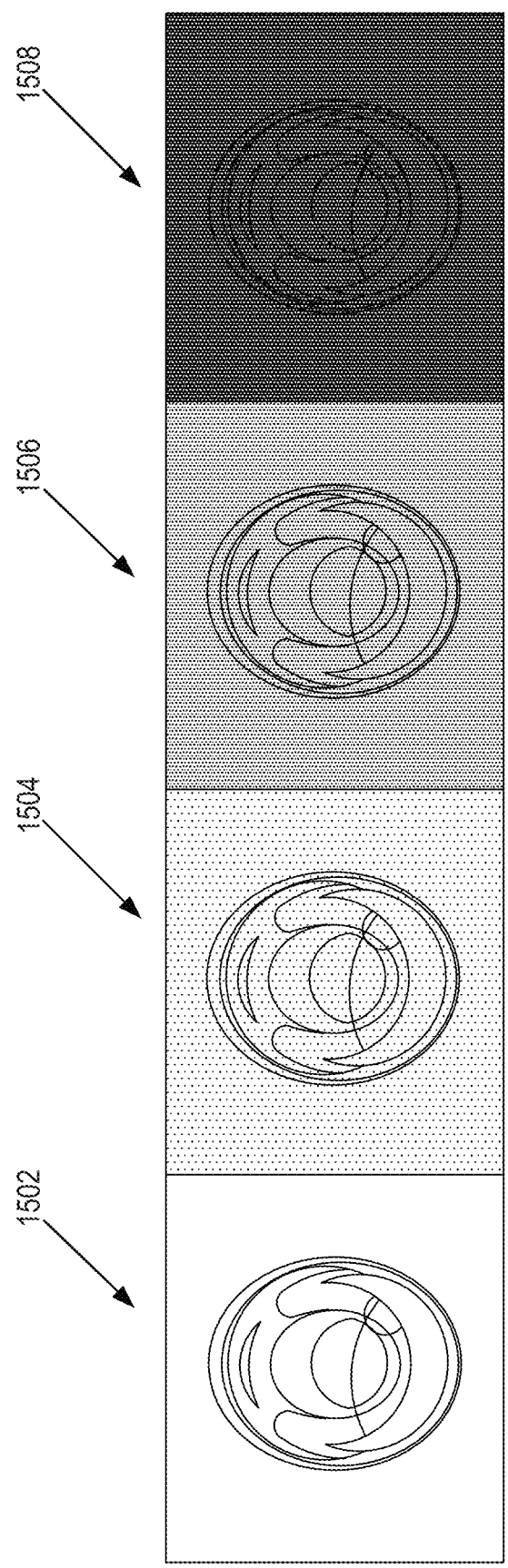
FIG. 15 illustrates eye textures, in accordance with some examples.

FIG. 15 illustrates eye textures 1502, 1504, 1506, and 1506, in accordance with some examples. The eye textures 1502, 1504, 1506, and 1508 are stored in the augmentation database 612 as shader augmentations 704 that are eye textures 720. The eye textures 1502, 1504, 1506, and 1506 are applied to the base model 604 and modified base model 608. Referring to FIG. 10, rendered image 1006 is augmented with eye texture 1502, rendered image 1008 is augmented with eye texture 1504, and rendered image 1010 is augmented with eye texture 1506. The eye textures 1502, 1504, 1506, and 1506 cover different textures used on the base model 604 and modified base model 608 and may be used to cover other augmentations from augmentation database 612 such as item augmentations 702. The eye textures 1502, 1504, 1506, and 1508 are objects represented with polygons and colors. The normalize module 622 resizes the eye textures 1502, 1504, 1506, and 1508 in accordance with the base model 604 or modified base model 608. For example, normalize module 622 resized eye texture 1502 to fit on the base model 808. The apply module 624 then applies the resized eye texture 1502 to the base model 808. Other augmentations are then added and then rendered to generate rendered image 1006.

Figure 16:
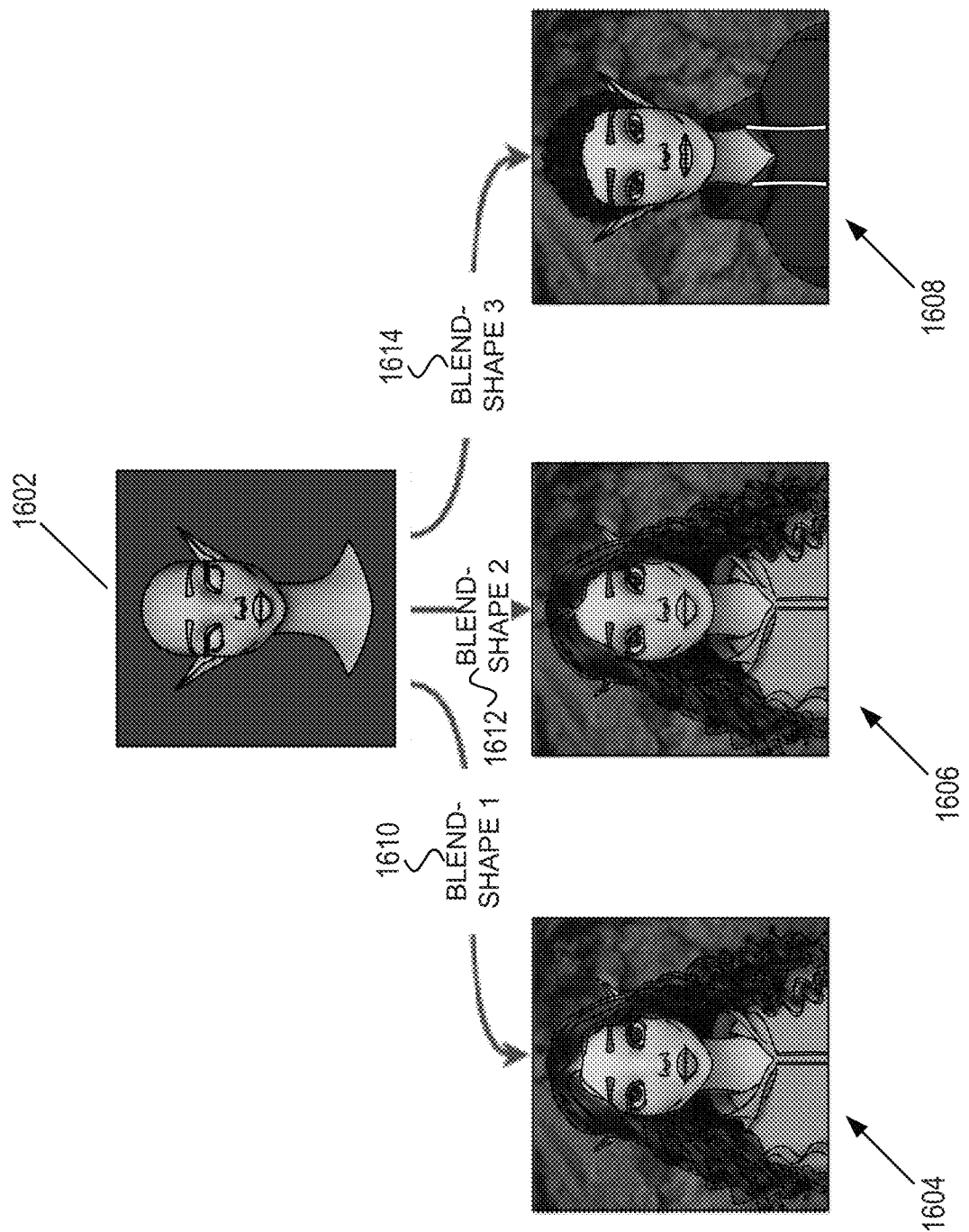
FIG. 16 illustrates applying blendshape augmentations to a 3D base model, in accordance with some examples.

FIG. 16 illustrates applying blendshape augmentations to a 3D base model, in accordance with some examples. Blendshape augmentations 706 (or morph augmentations) are indications of how the models 602 should be morphed or changed. For example, the blendshape augmentation 706 indicates changes to the locations of the vertices of the polygons of the models 602. The blendshape augmentations 706 include augmentations for changing the models 602 for different groups of people; body types; genders; mouth expressions including sad, smiling, laughing, kissing, wide smile, surprised, and extremely wide-opened mouth; eyes including gaze direction, eyes expression, and eyes blinking; and, brows including raised brow and lowered brow.

3D model 1602, which may be the same as base model 808 is morphed or changed by blendshape 1 1610, blendshape 2 1612, and blendshape 3 1614. Normalize module 622 adjusts blendshape 1 1610, blendshape 2 1612, and blendshape 3 1614, and then the apply module 624 applies the blendshapes to the 3D model 1602. Each of the new 3D models 1604, 1606, and 1608 are augmented modified base models 648 with augmentations 650 as blendshape 1 1610, blendshape 2 1612, and blendshape 3 1614, respectively. The augmentation module 614 generates augmented base model 636 with augmentations 638 corresponding to augmentations 650. Blendshape 1 1610 takes the 3D model 1602 and adjusts the 3D model for different facial features that may be attributed to a particular group of people for inclusivity considerations. Blendshape 2 1612 takes the 3D model 1602 and adjust the facial feature type to a broader face. Blendshape 3 1614 takes the 3D model 1602 and adjusts the facial features for a male version of the 3D model 1602. As illustrated the new 3D models 1604, 1606, and 1608 include additional augmentations such as hair augmentations and clothing augmentations.

Figure 17:
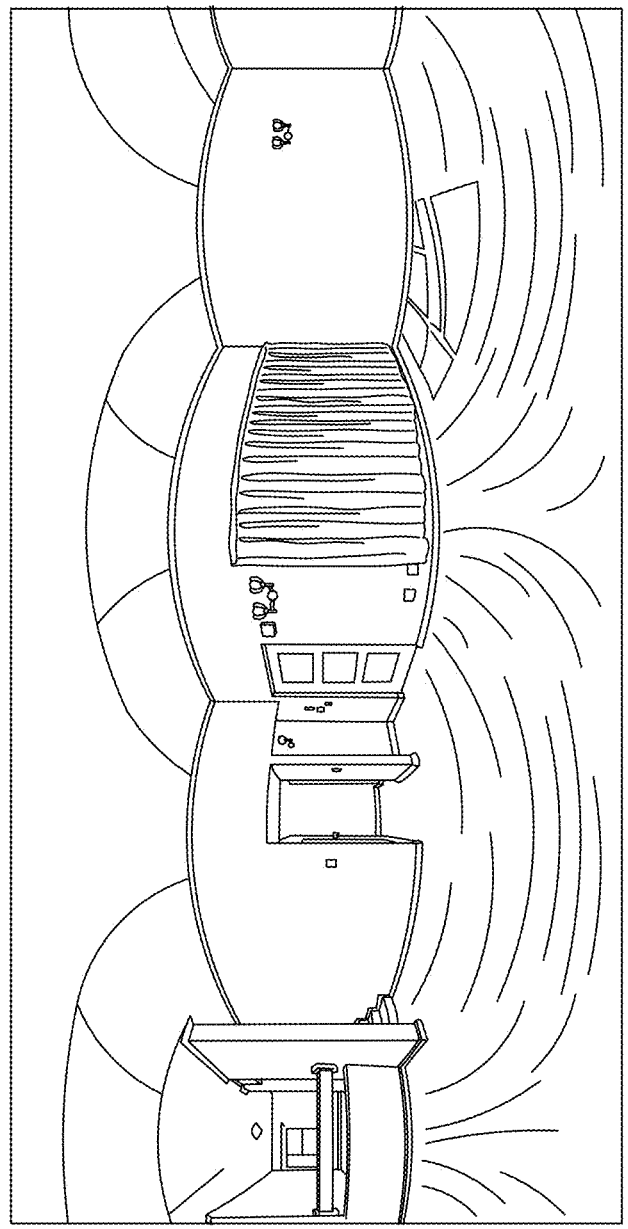
FIG. 17 illustrates High Dynamic Range Imagery (HDRI) lighting, in accordance with some examples.

FIG. 17 illustrates High Dynamic Range Imagery (HDRI) lighting 1700, in accordance with some examples. The augmentation database includes lighting augmentations 708 that are applied by the rendering module 660 in generating the rendered images 628 and 664.

Figure 18:
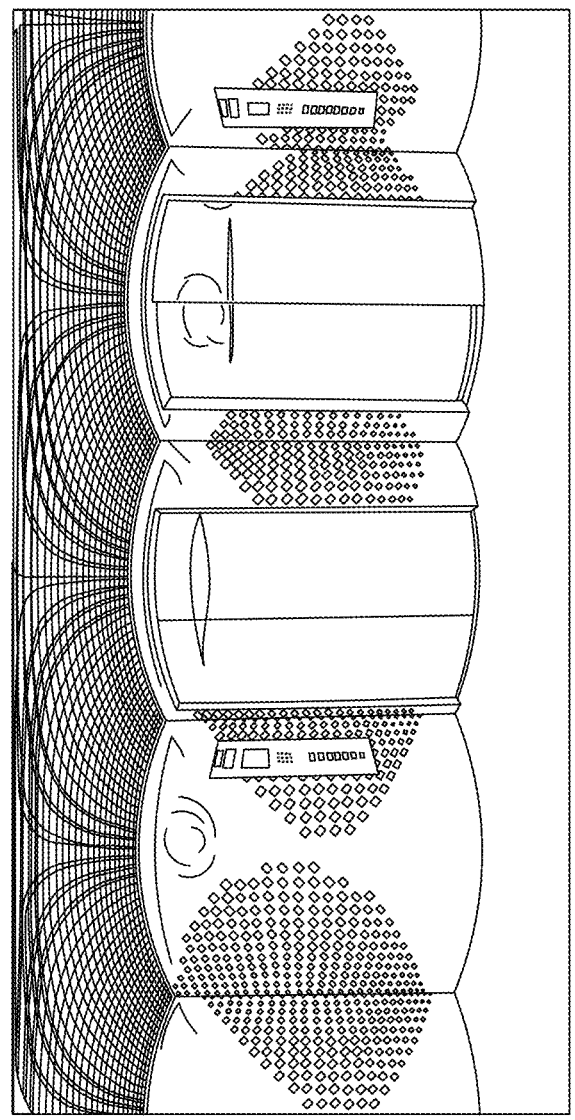
FIG. 18 illustrates HDRI lighting, in accordance with some examples.

ML models such as CNN 2206 are sensitive to the lighting used for the rendered images 628, 664. ML models that are trained with the ground truth input 626 and the ground truth output 662 where the lighting used to render the rendered images 628, 664 is only even bright light often will fail to generate satisfactory output images when the input image is dark or shady. The diversity module 618 ensures that a diversity of lighting augmentations 708 is used. The lighting augmentations 708 should include for heads bright lighting, dark lighting, and shady lighting. There two types of lighting augmentations 708. HDRI lighting 1700, which is a panoramic photo and covers all angles from a single point. Rendering module 660 uses the HDRI lighting 1700 to render the rendered images 628, 664. HDRI lighting 1700 enables the background of a rendered image to be augmented without re-rendering the rendered image. FIG. 18 illustrates HDRI lighting 1800, in accordance with some examples. HDRI lighting 1800 is another example of HDRI lighting.

Figure 19:
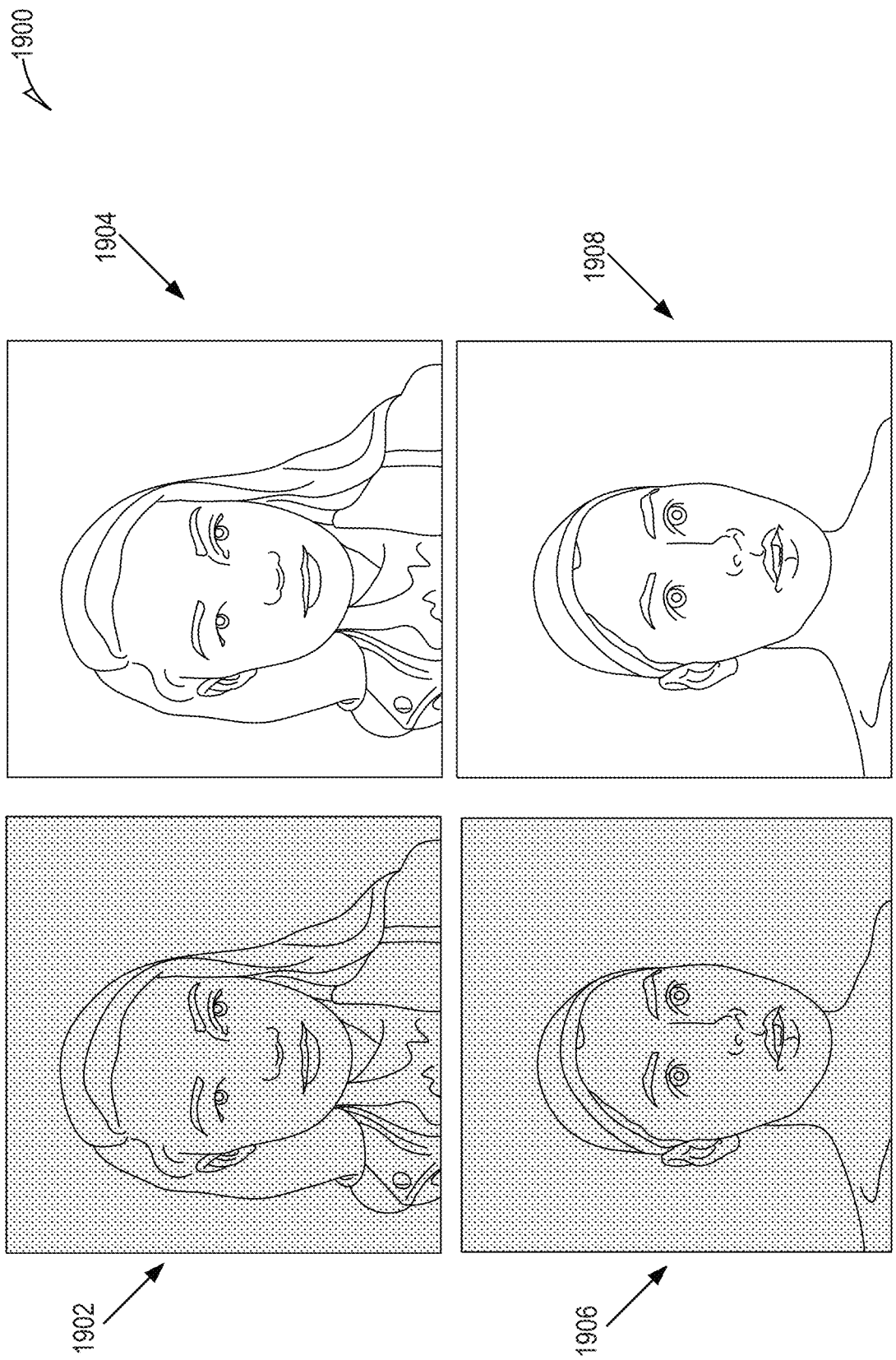
FIG. 19 illustrates rendered images with different lighting, in accordance with some examples.

FIG. 19 illustrates rendered images with different lighting 1900, in accordance with some examples. Lighting augmentations 708 include using lighting sources such as lamps and configuring their location and brightness in the scene with the augmented base model 636 and augmented modified base model 648. The rendering module 660 rendered the rendered images 1902, 1904, 1906, and 1908 with different lighting augmentations 708. In some examples, lighting augmentations 708 are used that are more likely to be used in application after the ML model has been trained. For example, one lighting augmentation 708 is a single light source for a self-portrait taken on mobile device, which may be a common input image for the ML model after it has been trained with the ground truth input 626 and ground truth output 662.

Figure 20:
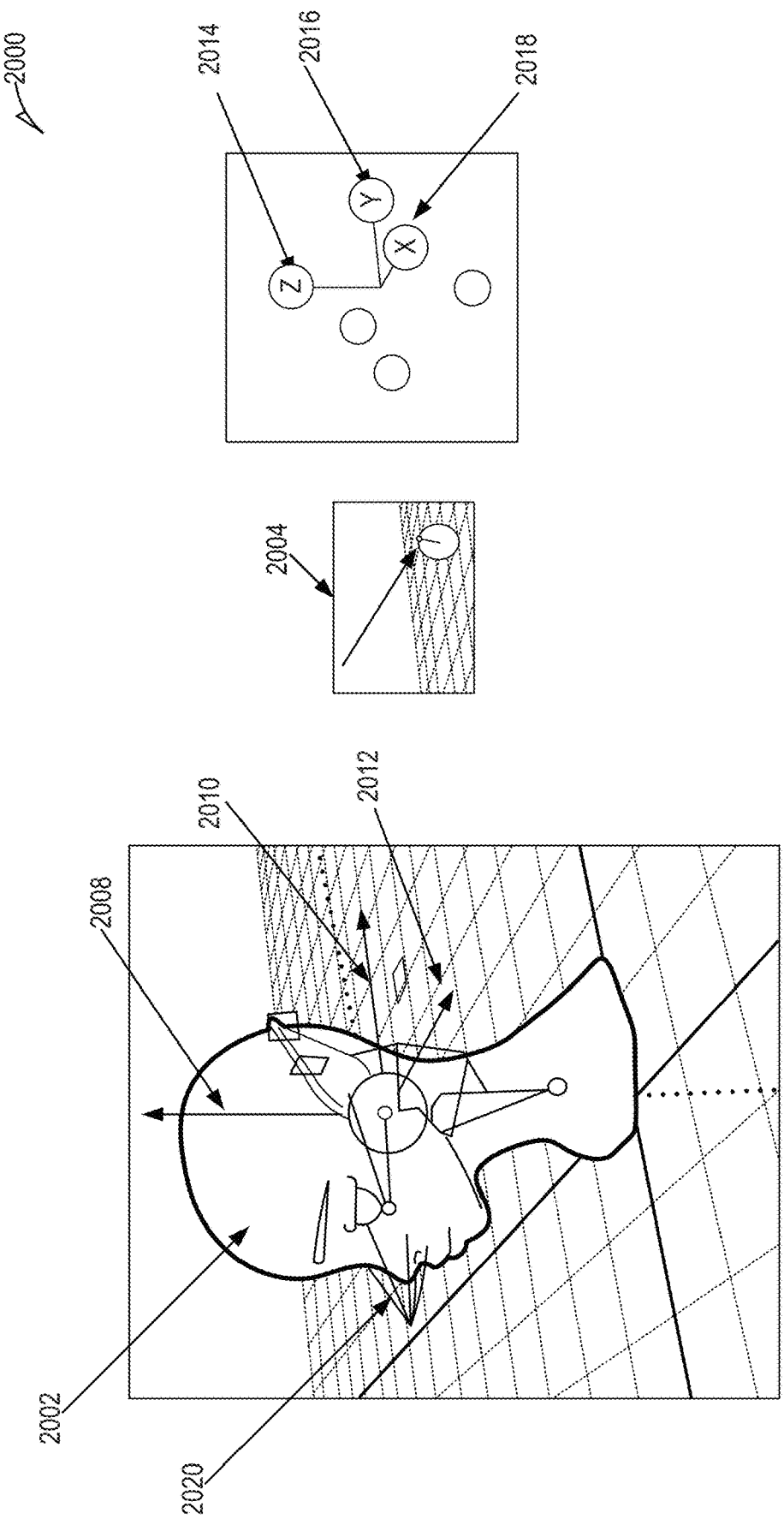
FIG. 20 illustrates the generation of orientation augmentations, in accordance with some examples.

FIG. 20 illustrates the generation of orientation augmentations 2000, in accordance with some examples. Illustrated in FIG. 20 is the 3D model 2002, the z-axis 2008, 2014, the y-axis 2010, 2016, the x-axis 2012, 2018, an anchor arrow 2004, and a vector (V) 2020 that is visualization line for the 3D model 2002. Referring to FIGS. 6 and 7, to train ML models the ground truth input 626 and ground truth output 662 include the base model 604 and modified base model 608 rendered by the rendering module 660 with different orientation augmentations 710.

The goal of the orientation augmentations 710 is to provide orientations in the ground truth input 626 and the ground truth output 662 that will be seen in an input to the ML model in production. The augmentation module 614 is configured to randomly select orientations augmentations 700 for the base model 608 over the y-axis 2010, 2016, which moves the base model 608 up and down and is termed pitch, and the x-axis 2012, 2018, which moves the base model 608 left and right and is termed yaw. In some examples, the z-axis 2008, 2014 is not changed when the 3D model 2002 is a crop of a user's head. A change in the z-axis 2008, 2014 would rotate the base model 608 and is termed roll. The input to the ML model in production crops a user's head, which forces the z-axis 2008, 2014 angle to be zero.

The augmentation module 614 adds an anchor arrow 2004 that is an object to the base model 608 that is located behind the head and bound to the 3D model 2002 so that the 3D model 2002 "looks" along vector V 2020 going from the anchor arrow 2004 to the point on the back of the head. The anchor arrow 2004 can be visualized as a ball and vector V 2020 is a line. The augmentation module 614 uses a circle in a plane formed by the y-axis 2010, 2016 and the x-axis 2012, 2018 and makes a full turn over a circle in the plane to select orientation augmentations 710 such as selecting 1000 orientation augmentations 710 based dividing the circle into 1000 discrete steps. In some examples, orientation augmentations 710 are not selected for orientations of the 3D model 2002 with the vector V 2020 would be looking backward or away.

Figure 21:
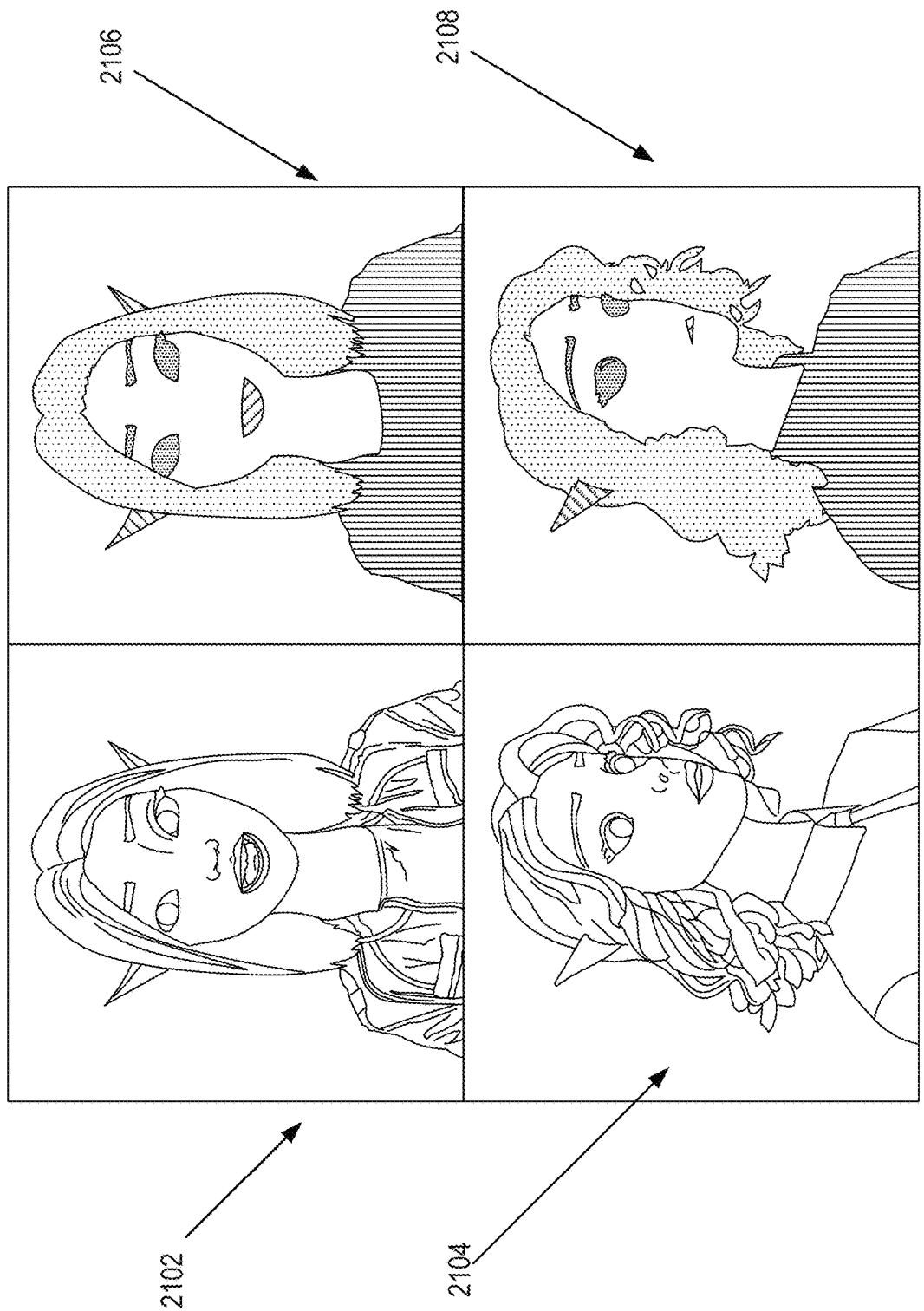
FIG. 21 illustrates mattes, in accordance with some examples.

FIG. 21 illustrates mattes, in accordance with some examples. The augmentation module 614 is configured to generate mattes 2106 and 2108 from a base model 604. 3D models 2102 and 2104 are rendered images from a modified base model 608 such as base model 808 where augmentations from the augmentation database 612 have been added and then rendered by the rendering module 660. The mattes 2106 and 2108 enable the augmentation module 614 to select portions of the augmented modified base model 648 or rendered images 664 to add or modify an augmentation. The mattes 2106 and 2108 are associated with indexes or labels that indicate the different portions of the mattes 2106 and 2108. For example, the eye area has a label of eyes and the augmentation module 614 can use the mattes 2106 and 2108 to select the eye area of 3D models 2102 and 2104 and change the eye area such as by changing the color of the eyes. In some examples the mattes are Cryptomattes®. The indexes or labels of the mattes 2106 and 2108 are the same as the indexes 640, 646, 652, 658, 632, and 668. Additionally, the augmentation database 612 includes indexes associated with augmentations stored in the augmentation database 612.

Figure 22:
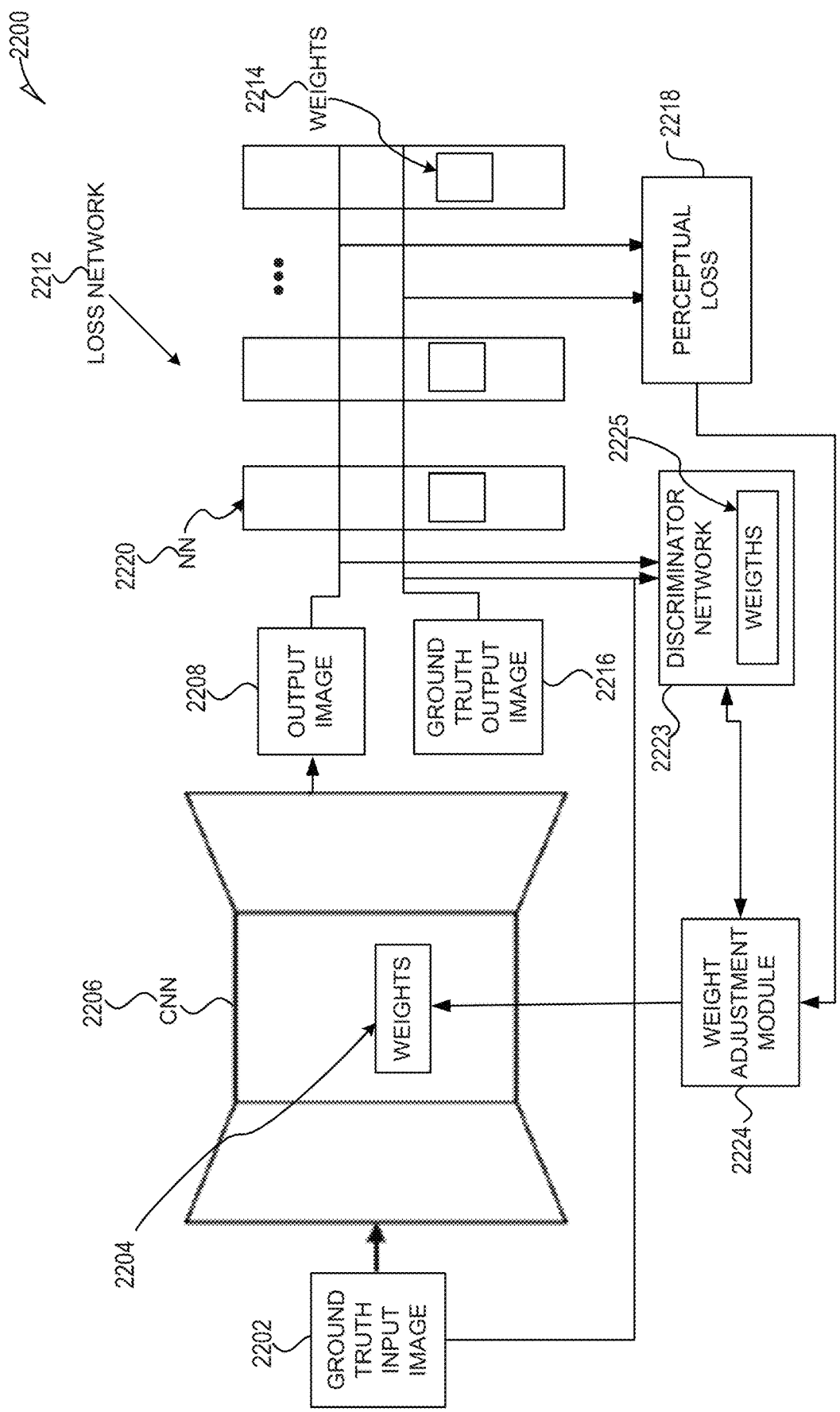
FIG. 22 illustrates a generative adversarial network (GAN) for training convolutional neural networks (CNNs), in accordance with some examples.

FIG. 22 illustrates a generative adversarial network (GAN) 2200 for training convolutional neural networks (CNNs), in accordance with some examples. FIG. 22 illustrates how the ground truth input 626 and ground truth output 662 can be used to trains a ML model such as CNN 2206. The CNN 2206 takes ground truth input image 2202 and generates or processes ground truth input image 2202 to generate output image 2208. Ground truth input image 2202 is the same or similar as ground rendered image 628 from ground truth input 626 and ground truth output image 2216 is the same or similar as rendered image 664 from ground truth output 662.

The CNN 2206, loss network 2212, and discriminator network 2223 are convolutional neural networks, in accordance with some examples. Each has multiple convolutional layers, pooling layers, and fully connected layers, in accordance with some examples. One or more of the networks may have up sampling and down sampling. One or more of the networks may have layers that are connected to the next layer in the network and an additional layer closer to the output layer. The fully connected layers use rectified linear unit (ReLU), in accordance with some examples.

Weight adjustment module 2224 is configured to adjust the weights 2204 of the CNN 2206 based on the perceptual losses 2218 and adversarial losses from the discriminator network 2223. Weight adjustment module 2224 adjusts the weights 2204 based on using a stochastic gradient descent method to determine weights 2204 that minimize or lessen the weighted sum of the loss functions. Weight adjustment module 2224 additionally trains discriminator network 2223 by changing the weights 2225 as described herein.

The perceptual loss 2218 is determined with the aid of a number of trained neural networks (NN) 2220. The loss network 2212 is trained based on images representing high-level features that are grouped into sets of high-level features, in accordance with some examples. The high-level features may include coloring information and lighting information. Each of the NNs 2220 may be trained for one or more high-level features by adjusting the weights 2214. The trained NNs 2220 determine high-level features for both the output image 2208 and the ground truth output image 2216. The perceptual loss 2218 is based on determining a high-level feature loss of the output image 2208 from the ground truth output image 2216. The perceptual loss is then determined by weight adjustment module 2224 based on regression analysis, in accordance with some examples. The weight adjustment module 2224 uses Equation (1) to determine the perceptual loss ($loss_{per}$), in accordance with some examples.

Equation (1): $Loss_{per}=E[\Sigma_{i=1}^{n} w_i l_{feat}(y_i, \hat{y}_i)]$, where $y_i$ is the ground truth output image 2216, $\hat{y}_i$ is the output image 2208, E is the expected value of the summation, n is the number of ground truth pairs, $l_{feat}$ is the feature reconstruction loss between $y_i$ and $\hat{y}_i$ for the features in accordance with the trained NNs 2220, and $w_i$ is a weight assigned to the feature i.

The loss of the CNN 2206 is determined by adjust weights module 2224 using Equation (2). Equation (2): $G_{loss}=E[\log(1-D(G(x)))]$, where $G_{loss}$ is the loss for image transformation network, E is the expected value, and D is the determination of the discriminator network 2223.

The discriminator network 2223 is trained to take as input the ground truth input image 2202 and an output image 2208 and output a value between 0 and 1 to indicate the likelihood that the output image 2208 is the ground truth output image 2216. The loss of the discriminator network 2223 is determined by weight adjustment module 2224 in accordance with Equation (3).

Equation (3): $D_{loss}=-E[\log(D(x_{real}))+ \log(1-D(G(x)))]$, where $D_{loss}$ is the loss for the discriminator network 2223, E is the expected value, x is the ground truth input image 2202, and $x_{real}$ is the ground truth output image 2216, $D(x_{real})$ is the prediction such as a value from 0 to 1 for whether $x_{real}$ is the ground truth output image 2216, and $D(G(x))$ is the prediction such as a value from 0 to 1 for whether $G(x)$, which is output image 2208, is the ground truth output image 2216.

Weight adjustment module 2224 determines the loss function for the CNN 2206 in accordance with Equation (4). Equation (4): $Loss=Loss_{per}+\alpha*G_{loss}$, where loss is the loss used to train the CNN 2206, $Loss_{per}$ is determined in accordance with Equation (1), $G_{loss}$ is determined in accordance with Equation (2), and a is a constant less than 1.

Weight adjustment module 2224 trains CNN 2206 and discriminator network 2223 in conjunction with one another. As the discriminator network 2223 becomes better at determining whether the output image 2208 is the ground truth output image 2216 or not, the CNN 2206 is trained to make the output image 2208 more like the ground truth output image 2216. In this way the two networks help each other train because as the discriminator network 2223 improves in distinguishing the output image 2208 and the ground truth output image 2216, the CNN 2206 improves in generating the output image 2208 to being closer to the ground truth output image 2216. Because the system for generating ground truths for machine learning 600 can generate an arbitrarily large set of training pairs under many different lighting scenarios and different 3D models, the CNN 2206 can be trained to process or transform the lighting under many different lighting scenarios and many different 3D models.

Figure 23:
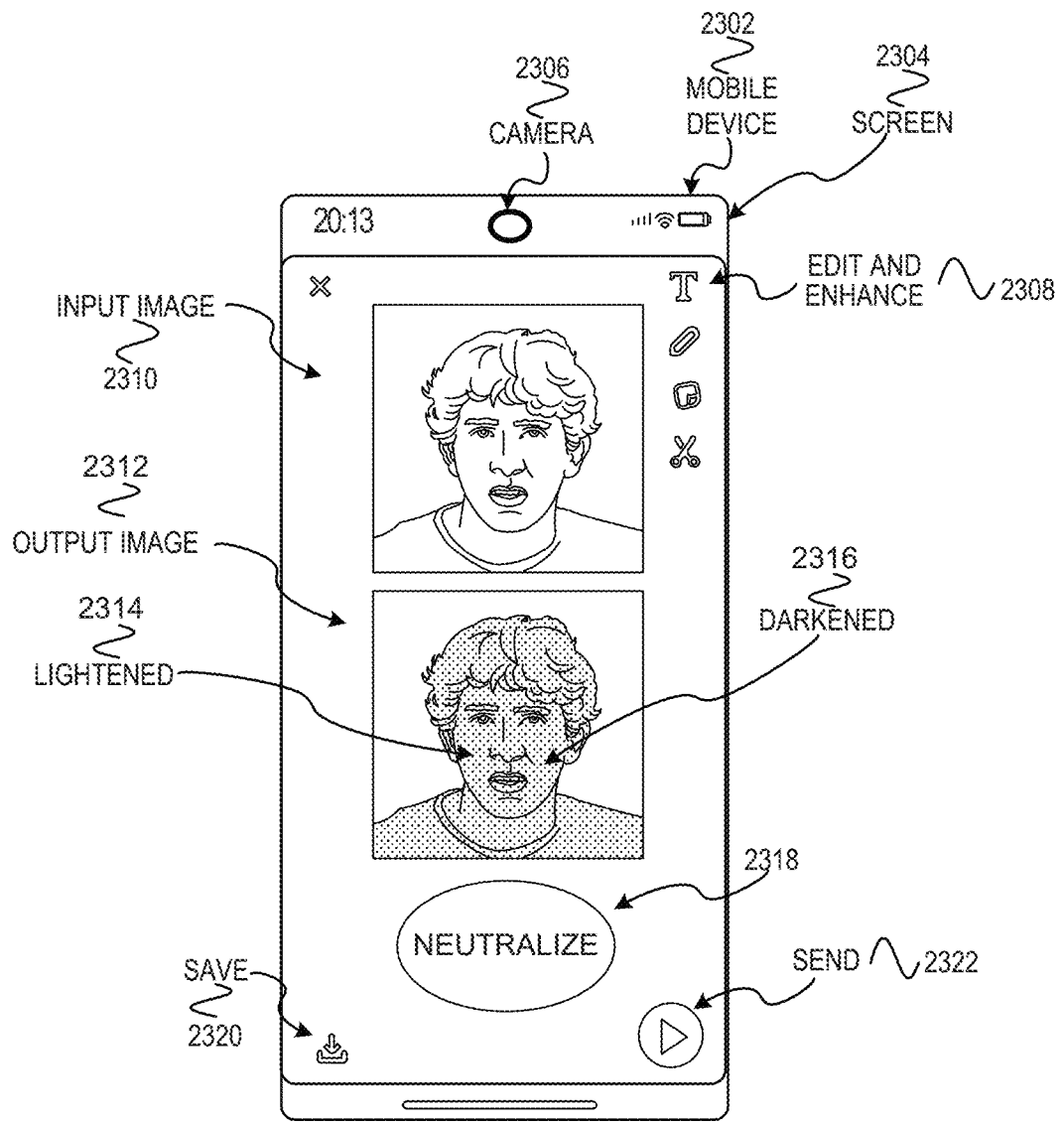
FIG. 23 illustrates an example application of a ML model, in accordance with some examples.

FIG. 23 illustrates an example application of a ML model, in accordance with some examples. FIG. 23 illustrates a mobile device 2302, which may be a client device 102, in accordance with some examples. The mobile device 2302 may include a camera 2306 and screen 2304. As illustrated, an input image 2310 is processed to generate output image 2312. The output image 2312 has areas that are lightened 2314 and areas that are darkened 2316 relative to the input image 2310. A user of the mobile device 2302 has selected for the input image 2310 to be neutralized 2318. The user may select to save 2320 the output image 2312 or send 2322 the output image 2312 such as through the messaging system 100 as an ephemeral message. The user may select edit and enhance 2308 to change the output image 2312 or add augmentations to the output image 2312. In some examples edit and enhance 2308 offers the user relighting options. In some examples, neutralize 2318 is offered as an option from a menu presented when edit and enhance 2308 is selected. The neutralize function is provided by a CNN 2206 trained with ground truth input 626 and ground truth output 662 where the neutralized light for the modified base model 608 is a fixed augmentation 621 so that different lighting augmentations 708 for the ground truth input 626 are changed to neutralized light.

Figure 24:
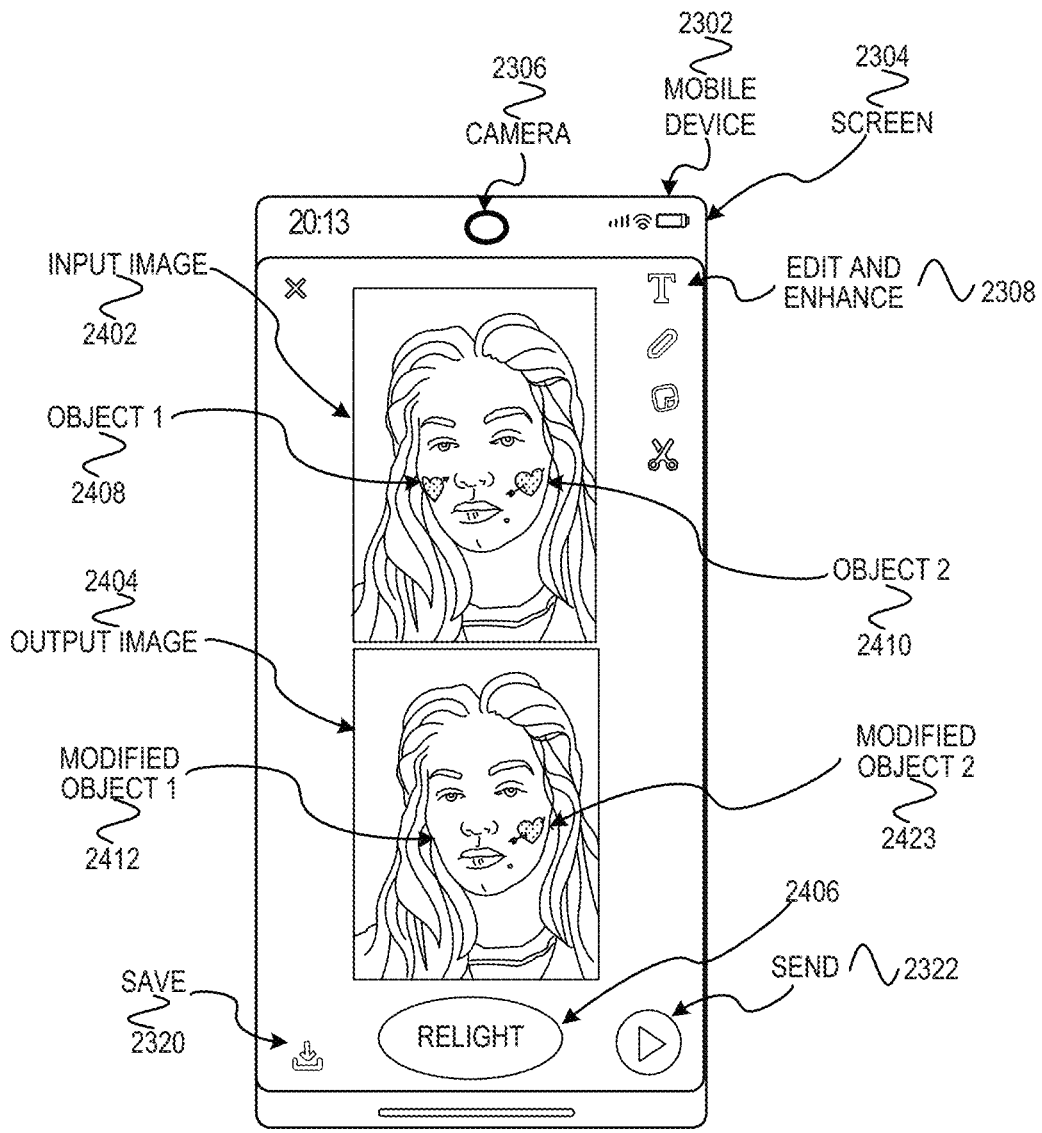
FIG. 24 illustrates an example application of a ML model, in accordance with some examples.

FIG. 24 illustrates an example application of a ML model, in accordance with some examples. As illustrated, an input image 2402 is processed to generate output image 2404. The input image 2402 has object 1 2408 and object 2 2410 that were added to an image using the edit and enhance 2308 features. The object 1 2408 and object 2 2410 have different lighting than the image of the person in input image 2402. The relight 2406 operation adjusts the lighting of object 1 2408 and object 2 2410 to generate modified object 1 2412 and modified object 2 2423. The relight function is provided by a CNN 2206 trained with ground truth input 626 and ground truth output 662 where item augmentations 702 includes object 1 2408 and object 2 2410 as well as other augmentations or objects that can be added to the input image 2402. The lighting of the item augmentations 702 is a fixed augmentation 621 so the lighting remains constant for the ground truth input 626 and lighting is adjusted or normalized for the ground truth output 662.

Figure 25:
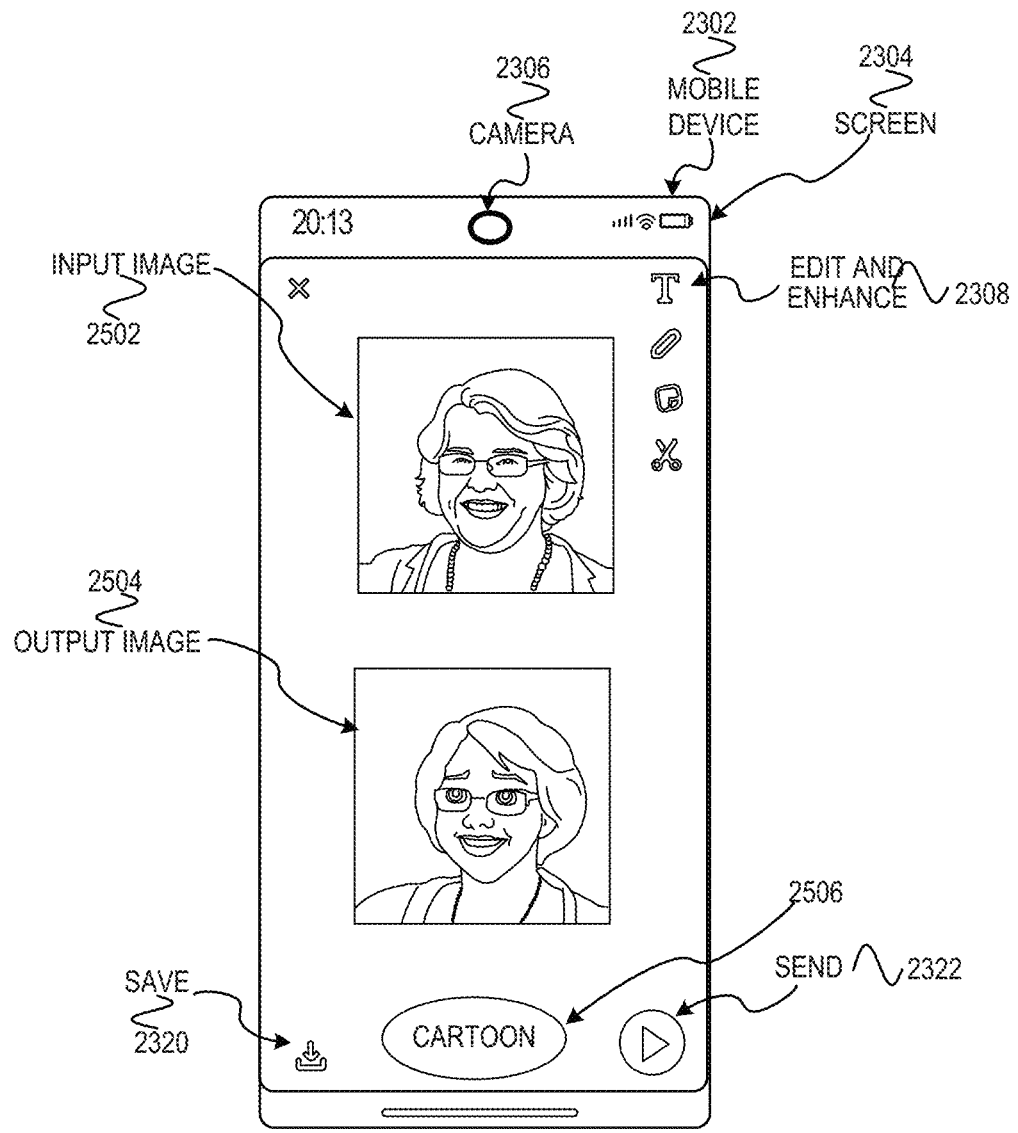
FIG. 25 illustrates an example application of a ML model, in accordance with some examples.

FIG. 25 illustrates an example application of a ML model, in accordance with some examples. As illustrated, an input image 2502 is processed to generate output image 2504. The input image 2502 is an image of a face of a person. The output image 2504 is an image of the face of the person turned into a cartoon image. The cartoon 2506 operation turns the face of the person into a cartoon. The cartoon function is provided by a CNN 2206 trained with ground truth input 626 and ground truth output 662 where the base model 604 is of a person and the modified base model 608 is of the person turned into a cartoon image. The augmentation module 614 and rendering module 660 select the augmentations from the augmentation database 612 to provide diverse and inclusive augmentations so that the CNN 2206 is trained to accommodate all types of people.

Figure 26:
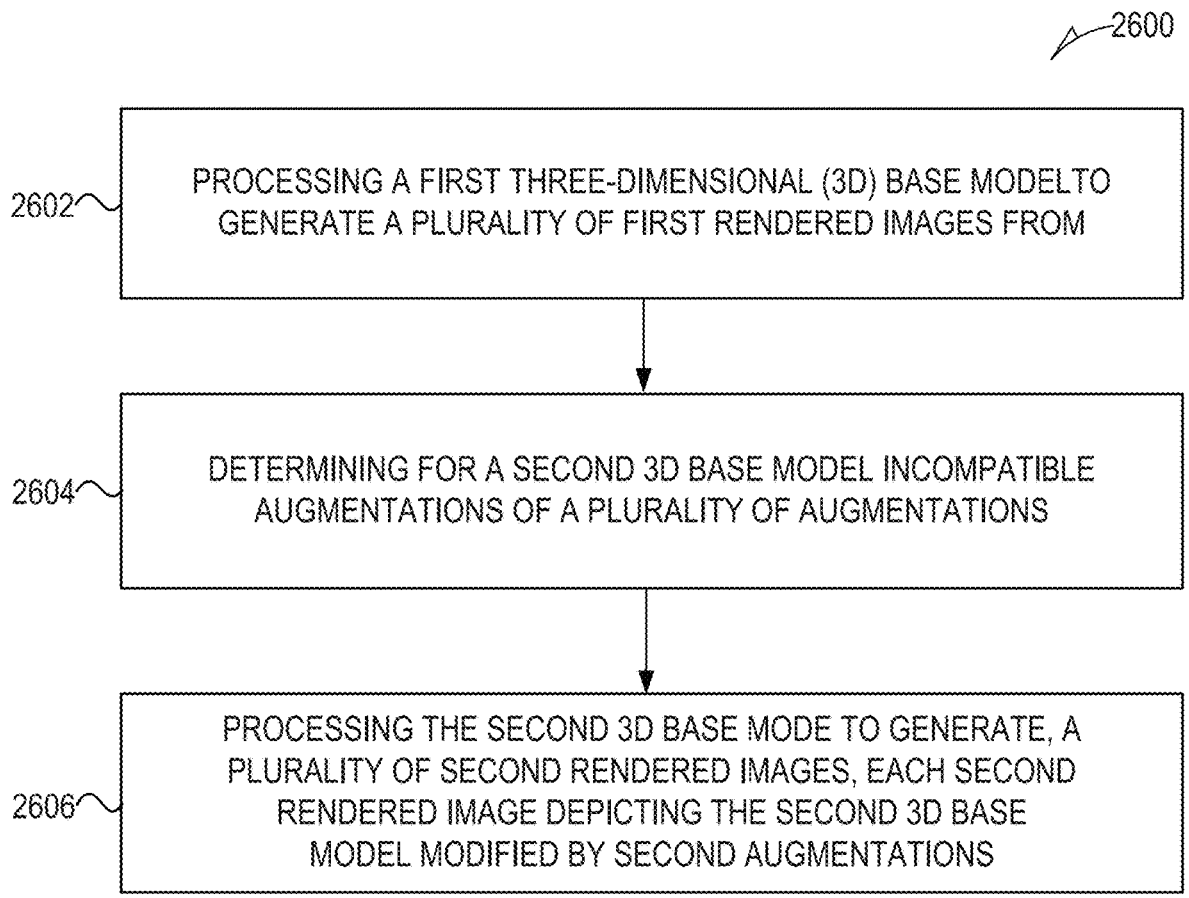
FIG. 26 illustrates a method of generating ground truths for machine learning models, in accordance with some examples.

FIG. 26 illustrates a method 2600 of generating ground truths for machine learning models, in accordance with some examples. The method begins at operation 2602 with processing a first 3D base model to generate a plurality of first rendered images. For example, processing a first 3D base model to generate a plurality of first images, each first image of the plurality of first images depicting the first 3D base model modified by first augmentations of a plurality of augmentations. Referring to FIG. 16, the augmentation module 614 and the rendering module 660 generated 3D models 1604, 1606, and 1608 from base model 808 where augmentation module 614 applied augmentations from the augmentation database 612 such as hair and clothes to the 3D model 1602.

The method 2600 continues at operation 2604 with determining for a second 3D base model incompatible augmentations of the plurality of augmentations. For example, determining, for a second 3D base model, incompatible augmentations of the first augmentations, the incompatible augmentations indicating modifications to fixed features of the second 3D base model. Referring to FIG. 8, the base model 808 has fixed features of the ears so any augmentations that change the ears are not applied to the base model 808.

The method 2600 continues at operation 2606 with processing the second 3D base model to generate a plurality of second rendered images, each second rendered image comprising the second 3D base model modified by second augmentations. For example, processing the second 3D base model to generate a second image for each of the plurality of first images, each second image depicting the second 3D base model modified by second augmentations, the second augmentations corresponding to the first augmentations of a corresponding first image, wherein the second augmentations comprises augmentations of the first augmentations that are not incompatible augmentations. Referring to FIG. 10, the augmentation module 614 and the rendering module 660 generated rendered images 1006, 1008, and 1010 from base model 808 where augmentation module 614 applied augmentations from the augmentation database 612 such as hair and clothes to the base model 808 but did not apply augmentations that would change the ears.

One or more of the operations of method 2600 may be optional. Method 2600 may include one or more additional operations. The operations of method 2600 may be performed in a different order.

Machine Architecture

Figure 27:
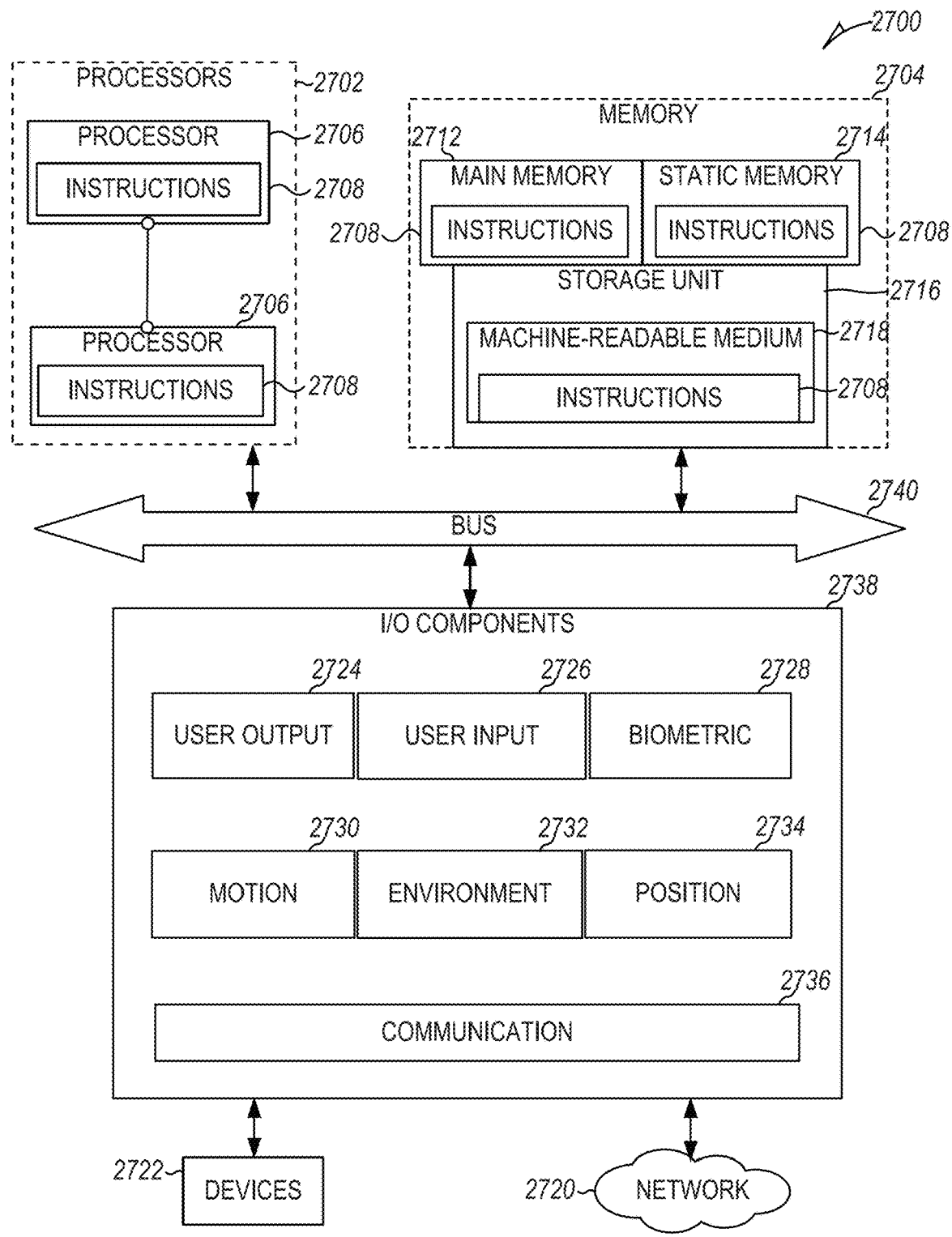
FIG. 27 is a diagrammatic representation of a machine in the form of a computer system within which a set of instructions may be executed for causing the machine to perform any one or more of the methodologies discussed herein, in accordance with some examples.

FIG. 27 is a diagrammatic representation of the machine 2700 within which instructions 2708 (e.g., software, a program, an application, an applet, an app, or other executable code) for causing the machine 2700 to perform any one or more of the methodologies discussed herein may be executed. For example, the instructions 2708 may cause the machine 2700 to execute any one or more of the methods described herein. The instructions 2708 transform the general, non-programmed machine 2700 into a particular machine 2700 programmed to carry out the described and illustrated functions in the manner described. The machine 2700 may operate as a standalone device or may be coupled (e.g., networked) to other machines. In a networked deployment, the machine 2700 may operate in the capacity of a server machine or a client machine in a server-client network environment, or as a peer machine in a peer-to-peer (or distributed) network environment. The machine 2700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2708, sequentially or otherwise, that specify actions to be taken by the machine 2700. Further, while only a single machine 2700 is illustrated, the term "machine" shall also be taken to include a collection of machines that individually or jointly execute the instructions 2708 to perform any one or more of the methodologies discussed herein. The machine 2700, for example, may comprise the client device 102 or any one of a number of server devices forming part of the messaging server system 108. In some examples, the machine 2700 may also comprise both client and server systems, with certain operations of a particular method or algorithm being performed on the server-side and with certain operations of the particular method or algorithm being performed on the client-side.

The machine 2700 may include processors 2702, memory 2704, and input/output I/O components 2738, which may be configured to communicate with each other via a bus 2740. The processors 2702 may be termed computer processors, in accordance with some examples. In an example, the processors 2702 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2706 and a processor 2702 that execute the instructions 2708. The term "processor" is intended to include multi-core processors that may comprise two or more independent processors (sometimes referred to as "cores") that may execute instructions contemporaneously. Although FIG. 27 shows multiple processors 2702, the machine 2700 may include a single processor with a single-core, a single processor with multiple cores (e.g., a multi-core processor), multiple processors with a single core, multiple processors with multiples cores, or any combination thereof.

The memory 2704 includes a main memory 2712, a static memory 2714, and a storage unit 2716, both accessible to the processors 2702 via the bus 2740. The main memory 2704, the static memory 2714, and storage unit 2716 store the instructions 2708 embodying any one or more of the methodologies or functions described herein. The instructions 2708 may also reside, completely or partially, within the main memory 2712, within the static memory 2714, within machine-readable medium 2718 within the storage unit 2716, within at least one of the processors 2702 (e.g., within the Processor's cache memory), or any suitable combination thereof, during execution thereof by the machine 2700.

The I/O components 2738 may include a wide variety of components to receive input, provide output, produce output, transmit information, exchange information, capture measurements, and so on. The specific I/O components 2738 that are included in a particular machine will depend on the type of machine. For example, portable machines such as mobile phones may include a touch input device or other such input mechanisms, while a headless server machine will likely not include such a touch input device. It will be appreciated that the I/O components 2738 may include many other components that are not shown in FIG. 27. In various examples, the I/O components 2738 may include user output components 2724 and user input components 2726. The user output components 2724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2738 may include biometric components 2728, motion components 2730, environmental components 2732, or position components 2734, among a wide array of other components. For example, the biometric components 2728 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2730 include acceleration sensor components (e.g., accelerometer), gravitation sensor components, rotation sensor components (e.g., gyroscope).

The environmental components 2732 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detect ion sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 2734 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2738 further include communication components 2736 operable to couple the machine 2700 to a network 2720 or devices 2722 via respective coupling or connections. For example, the communication components 2736 may include a network interface Component or another suitable device to interface with the network 2720. In further examples, the communication components 2736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2722 may be another machine or any of a wide variety of peripheral devices (e.g., a peripheral device coupled via a USB).

Moreover, the communication components 2736 may detect identifiers or include components operable to detect identifiers. For example, the communication components 2736 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2736, such as location via Internet Protocol (IP) geolocation, location via Wi-Fi® signal triangulation, location via detecting an NFC beacon signal that may indicate a particular location, and so forth.

The various memories (e.g., main memory 2712, static memory 2714, and memory of the processors 2702) and storage unit 2716 may store one or more sets of instructions and data structures (e.g., software) embodying or used by any one or more of the methodologies or functions described herein. These instructions (e.g., the instructions 2708), when executed by processors 2702, cause various operations to implement the disclosed examples.

The instructions 2708 may be transmitted or received over the network 2720, using a transmission medium, via a network interface device (e.g., a network interface component included in the communication components 2736) and using any one of several well-known transfer protocols (e.g., hypertext transfer protocol (HTTP)). Similarly, the instructions 2708 may be transmitted or received using a transmission medium via a coupling (e.g., a peer-to-peer coupling) to the devices 2722.

Software Architecture

Figure 28:
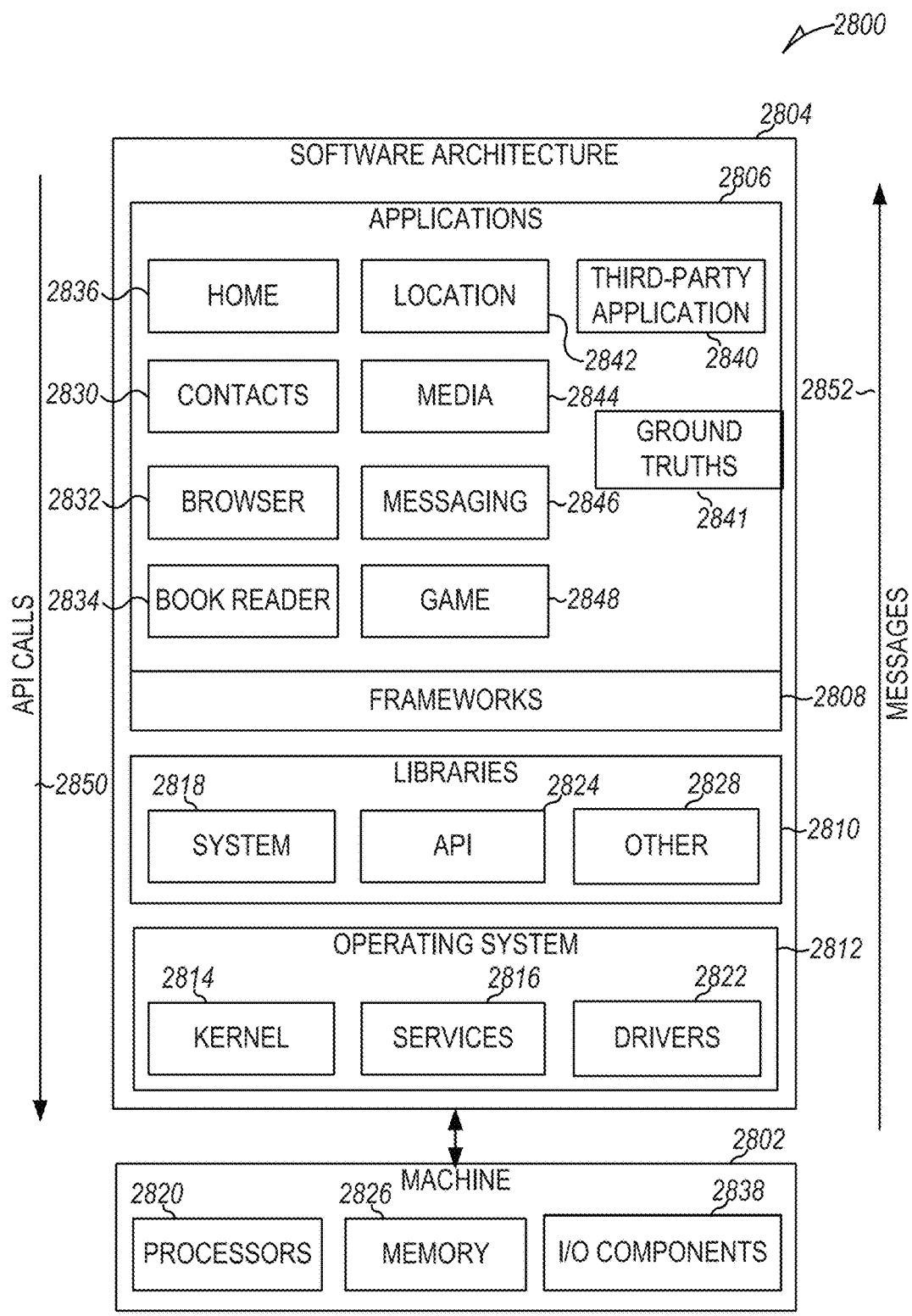
FIG. 28 is a block diagram showing a software architecture within which examples may be implemented.

FIG. 28 is a block diagram 2800 illustrating a software architecture 2804, which can be installed on any one or more of the devices described herein. The software architecture 2804 is supported by hardware such as a machine 2802 that includes processors 2820, memory 2826, and I/O components 2838. In this example, the software architecture 2804 can be conceptualized as a stack of layers, where each layer provides a particular functionality. The software architecture 2804 includes layers such as an operating system 2812, libraries 2810, frameworks 2808, and applications 2806. Operationally, the applications 2806 invoke API calls 2850 through the software stack and receive messages 2852 in response to the API calls 2850.

The operating system 2812 manages hardware resources and provides common services. The operating system 2812 includes, for example, a kernel 2814, services 2816, and drivers 2822. The kernel 2814 acts as an abstraction layer between the hardware and the other software layers. For example, the kernel 2814 provides memory management, processor management (e.g., scheduling), component management, networking, and security settings, among other functionality. The services 2816 can provide other common services for the other software layers. The drivers 2822 are responsible for controlling or interfacing with the underlying hardware. For instance, the drivers 2822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2810 provide a common low-level infrastructure used by the applications 2806. The libraries 2810 can include system libraries 2818 (e.g., C standard library) that provide functions such as memory allocation functions, string manipulation functions, mathematic functions, and the like. In addition, the libraries 2810 can include API libraries 2824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2810 can also include a wide variety of other libraries 2828 to provide many other APIs to the applications 2806.

The frameworks 2808 provide a common high-level infrastructure that is used by the applications 2806. For example, the frameworks 2808 provide various graphical user interface (GUI) functions, high-level resource management, and high-level location services. The frameworks 2808 can provide a broad spectrum of other APIs that can be used by the applications 2806, some of which may be specific to a particular operating system or platform.

In an example, the applications 2806 may include a home application 2836, a contacts application 2830, a browser application 2832, a book reader application 2834, a ground truths 2841 generation application, a location application 2842, a media application 2844, a messaging application 2846, a game application 2848, and a broad assortment of other applications such as a third-party application 2840. The ground truths 2841 generation application may perform the operations as disclosed in conjunction with FIG. 6 and herein. The applications 2806 are programs that execute functions defined in the programs. Various programming languages can be employed to create one or more of the applications 2806, structured in a variety of manners, such as object-oriented programming languages (e.g., Objective-C, Java, or C++) or procedural programming languages (e.g., C or assembly language). In a specific example, the third-party application 2840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2840 can invoke the API calls 2850 provided by the operating system 2812 to facilitate functionality described herein.

Processing Components

Figure 29:
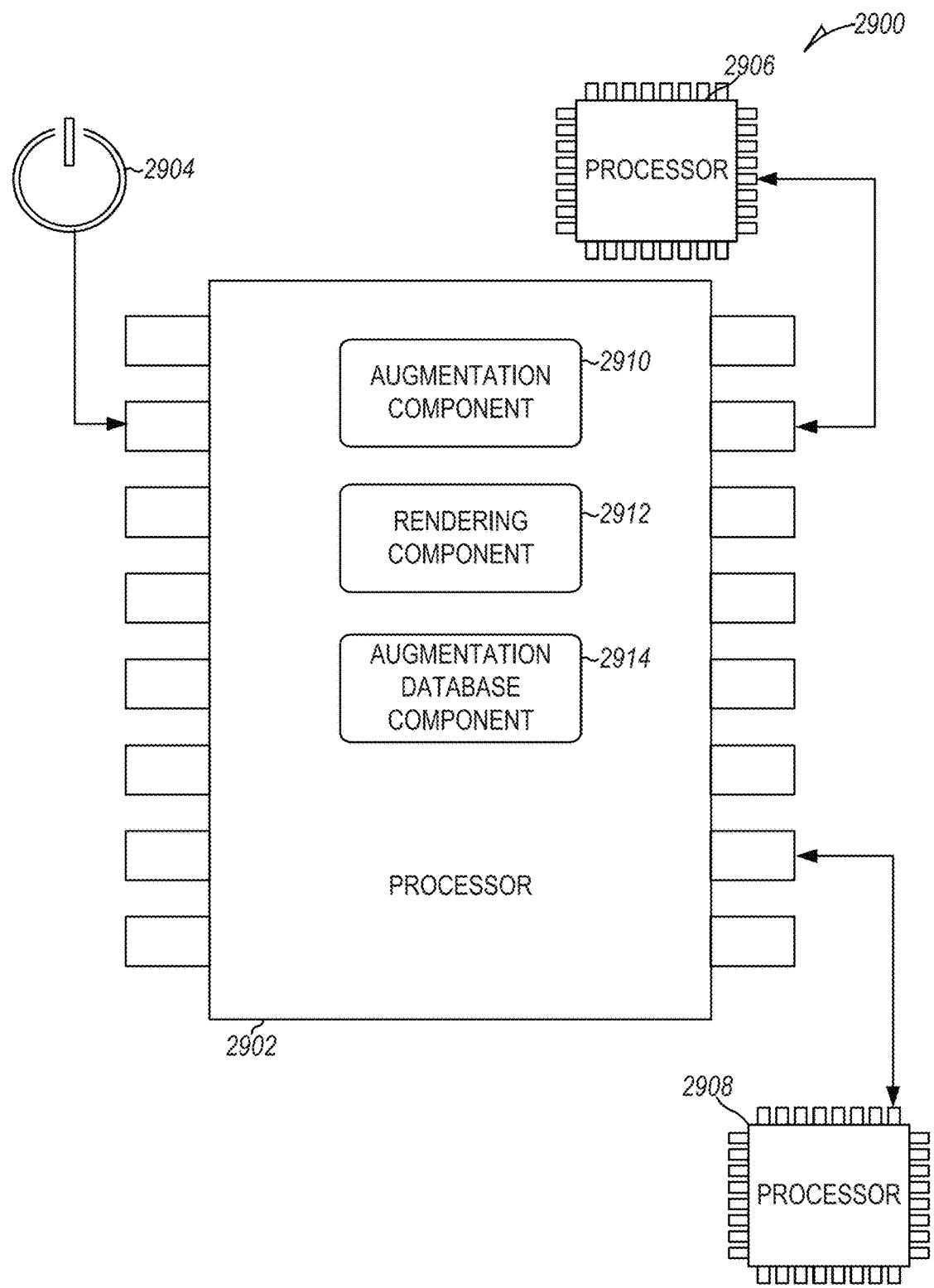
FIG. 29 is a diagrammatic representation of a processing environment, in accordance with some examples.

Turning now to FIG. 29, there is shown a diagrammatic representation of a processing environment 2900, which includes a processor 2902, a processor 2906, and a processor 2908 (e.g., a GPU, CPU or combination thereof). The processor 2902 is shown to be coupled to a power source 2904, and to include (either permanently configured or temporarily instantiated) modules, namely an augmentation component 2910, a rendering component 2912, and an augmentation database component 2914. Referring to FIG. 6, the augmentation component 2910 operationally selects and adds augmentations 638, 644, 650, 656 to augmented base model 636, augmented simplified base model 642, augmented modified base model 648, and augmented simplified modified base model 654, respectfully; the rendering component 2912 takes augmentations 634 and processes the augmentations 634 to generate rendered images 628, 664; and, the augmentation database component 2914 operationally performs the operations of managing the augmentation database 612, which may be distributed. As illustrated, the processor 2902 is communicatively coupled to both the processor 2906 and the processor 2908.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example examples, the processors or processor-implemented components may be located in a single geographic location (e.g., within a home environment, an office environment, or a server farm). In other example examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. The plural of "computer-readable medium" may be termed "computer-readable mediums".

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   processing a plurality of augmentations to categorize the plurality of augmentations into categories, the categories comprising a gender and a group of people;
   selecting first augmentations from each of the categories;
   processing a first three-dimensional (3D) base model to generate a plurality of first images, each first image of the plurality of first images depicting the first 3D base model modified by the first augmentations;
   determining, for a second 3D base model, incompatible augmentations of the first augmentations, the incompatible augmentations indicating modifications to fixed features of the second 3D base model; and
   processing the second 3D base model to generate a second image for each of the plurality of first images, each second image depicting the second 3D base model modified by second augmentations, the second augmentations corresponding to the first augmentations of a corresponding first image, wherein the second augmentations comprise augmentations of the first augmentations that are not incompatible augmentations.

2. The method of claim 1 further comprising:
   processing the first 3D base model to modify the first 3D base model to generate the second 3D base model.

3. The method of claim 1 wherein the plurality of augmentations comprises: item augmentations, shader augmentations, blend shape augmentations, lighting augmentations, and orientation augmentations.

4. The method of claim 1 wherein each category of the categories includes a proxy object associated with the first 3D base model, wherein the first augmentations are applied in accordance with a corresponding proxy object, and wherein the proxy object comprises a plurality of polygons and a location relative to the first 3D base model.

5. The method of claim 4 wherein the proxy object is a first proxy object, wherein each category of the categories includes a second proxy object associated with the second 3D base model, wherein the second augmentations are applied in accordance with a corresponding second proxy object, and wherein the second proxy object comprises a plurality of polygons and a location relative to the second 3D base model.

6. The method of claim 1 wherein a matte comprises a plurality of regions each region indicating a portion of the first 3D base model, wherein each category of the categories is associated with a region of the plurality of regions, and wherein the first augmentations are applied to regions of the first 3D base model in accordance with a corresponding region.

7. The method of claim 1 wherein the fixed features comprise one or more of a skin color, an ear shape, a facial expression, a clothing item, a lighting of the second 3D base model, and a shading of the second 3D base model.

8. The method of claim 1 wherein the first augmentations are modified for the first 3D base model and the second augmentations are modified for the second 3D base model.

9. The method of claim 1 wherein the first 3D base model comprises a mesh of polygons with vertices and wherein the first augmentations comprise a morph augmentation that indicates how to modify the vertices of the mesh with the morph augmentation.

10. The method of claim 9 wherein the morph augmentation is a facial expression or a facial structure indicating a group of people.

11. The method of claim 1 further comprising:
    processing the first 3D base model to generate a simplified first 3D base model, wherein the first 3D base model comprises a first plurality of polygons and the simplified first 3D base model comprises a second plurality of polygons, and wherein a number of the first plurality of polygons is greater than a number of the second plurality of polygons; and
    generating one or more of the plurality of first images from the simplified first 3D base model.

12. The method of claim 1 wherein the plurality of second images are a ground truth input and the plurality of second images are a ground truth output.

13. The method of claim 12 further comprising:
training a convolutional neural network using the ground truth input and the ground truth output.

14. The method of claim 1 further comprising:
rendering the plurality of first images and the plurality of second images.

15. A system comprising:
one or more computer processors; and
one or more computer-readable mediums storing instructions that, when executed by the one or more computer processors, cause the system to perform operations comprising:
processing a plurality of augmentations to categorize the plurality of augmentations into categories, the categories comprising a gender and a group of people;
selecting first augmentations from each of the categories;
processing a first three-dimensional (3D) base model to generate a plurality of first images, each first image of the plurality of first images depicting the first 3D base model modified by the first augmentations;
determining, for a second 3D base model, incompatible augmentations of the first augmentations, the incompatible augmentations indicating modifications to fixed features of the second 3D base model; and
processing the second 3D base model to generate a second image for each of the plurality of first images, each second image depicting the second 3D base model modified by second augmentations, the second augmentations corresponding to the first augmentations of a corresponding first image, wherein the second augmentations comprise augmentations of the first augmentations that are not incompatible augmentations.

16. The system of claim 15 wherein the plurality of augmentations comprises: item augmentations, shader augmentations, blend shape augmentations, lighting augmentations, and orientation augmentations.

17. A non-transitory computer-readable storage medium including instructions that, when processed by a computer, configure the computer to perform operations comprising:
processing a plurality of augmentations to categorize the plurality of augmentations into categories, the categories comprising a gender and a group of people;
selecting first augmentations from each of the categories;
processing a first three-dimensional (3D) base model to generate a plurality of first images, each first image of the plurality of first images depicting the first 3D base model modified by the first augmentations;
determining, for a second 3D base model, incompatible augmentations of the first augmentations, the incompatible augmentations indicating modifications to fixed features of the second 3D base model; and
processing the second 3D base model to generate a second image for each of the plurality of first images, each second image depicting the second 3D base model modified by second augmentations, the second augmentations corresponding to the first augmentations of a corresponding first image, wherein the second augmentations comprise augmentations of the first augmentations that are not incompatible augmentations.

18. The non-transitory computer-readable storage medium of claim 17 wherein the plurality of augmentations comprises: item augmentations, shader augmentations, blend shape augmentations, lighting augmentations, and orientation augmentations.

\* \* \* \* \*